US012682856B2

(12) United States Patent
Han et al.

(10) Patent No.: US 12,682,856 B2
(45) Date of Patent: Jul. 14, 2026

(54) PIXEL AND DISPLAY DEVICE INCLUDING THE PIXEL

(71) Applicant: LG Display Co., Ltd., Seoul (KR)

(72) Inventors: Sungsu Han, Paju-si (KR); Hyunsuk Cho, Paju-si (KR); Sanghyuck Bae, Paju-si (KR); Juhong Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/188,489

(22) Filed: Apr. 24, 2025

(65) Prior Publication Data

US 2026/0179565 A1 Jun. 25, 2026

(30) Foreign Application Priority Data

Dec. 24, 2024 (KR) ........................ 10-2024-0195188

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0823* (2013.01); *G09G 2300/0852* (2013.01); *G09G 2300/0861* (2013.01); *G09G 2310/0286* (2013.01); *G09G 2310/061* (2013.01); *G09G 2310/08* (2013.01); *G09G 2320/0233* (2013.01); *G09G 2320/029* (2013.01); *G09G 2320/0693* (2013.01)

(58) Field of Classification Search
None
See application file for complete search history.

(56) References Cited

U.S. PATENT DOCUMENTS 12,243,485 B2 3/2025 Kim et al.
2022/0173189 A1 6/2022 Kim et al.

FOREIGN PATENT DOCUMENTS

KR 10-2022-0076872 A 6/2022

*Primary Examiner* — Aneeta Yodichkas
(74) *Attorney, Agent, or Firm* — Fenwick & West LLP

(57) ABSTRACT

A pixel and a display device including the pixel are provided. The pixel includes a light-emitting element, a driving transistor connected between a first node coupled to the light-emitting element and a third node coupled to a high-potential driving voltage line, with a gate electrode connected to a second node, a switching transistor connected between a data line and the second node, with a gate electrode configured to receive a first scan signal, a sensing transistor connected between the driving transistor and a readout line, with a gate electrode configured to receive a third scan signal, a connection transistor connected between the light-emitting element and a light-emitting element of an adjacent pixel, and a connection control transistor connected between the sensing transistor and the light-emitting element, with a gate electrode configured to receive a third light-emission signal.

19 Claims, 22 Drawing Sheets

PIXEL AND DISPLAY DEVICE INCLUDING THE PIXEL

CROSS REFERENCE TO RELATED APPLICATION

The present application claims priority to Republic of Korea Patent Application No. 10-2024-0195188, filed on Dec. 24, 2024, which is hereby incorporated by reference in its entirety.

BACKGROUND

Field Technology

The present disclosure relates to a pixel and a display device including the pixel.

Description of the Related Art

A pixel of a display device includes a light-emitting element and a driving circuit for driving the light-emitting element. The light-emitting element may be selected in various ways depending on the type of display device, but in recent years, organic light-emitting diodes (OLEDs), which offer fast response speeds, excellent luminous efficiency, brightness, viewing angles, contrast ratios, and color reproduction, have been actively utilized.

During the operation of the display device, components of the driving circuit may degrade. The degradation of these components reduces the luminance of the pixel. To address this issue, a compensation method that senses the characteristics of the components and compensates the data voltage based on the sensing results has been applied.

When a pixel is sensed, a predetermined sensing current flows within the pixel, and since applying the sensing current to the light-emitting element may result in abnormal image output, the electrical path between the sensing current and the light-emitting element must be blocked. However, in this case, image output from the pixel is interrupted during sensing, which may lead to degraded image quality due to visual artifacts such as dark spots and image discontinuities.

SUMMARY

It is an object of the embodiments to provide a pixel and a display device including the pixel, capable of sensing characteristic values of the pixel during display driving to compensate for degradation.

It is another object of the embodiments to provide a pixel and a display device including the pixel, capable of enabling simultaneous image display while the pixel is being sensed during display driving.

It is another object of the embodiments to provide a pixel and a display device including the pixel, capable of enabling a driving current output from adjacent pixels to be applied to the light-emitting element of the pixel whose characteristic value is being sensed.

It is still another object of the embodiments to provide a display device capable of generating a scan signal and a light-emission signal for controlling the switching elements of a sensing pixel in response to a turn-on level scan signal applied to the sensing pixel.

A pixel according to an embodiment may include a light-emitting element, a driving transistor connected between a first node coupled to the light-emitting element and a third node coupled to a high-potential driving voltage line, with a gate electrode connected to a second node, a switching transistor connected between a data line and the second node, with a gate electrode configured to receive a first scan signal, a sensing transistor connected between the driving transistor and a readout line, with a gate electrode configured to receive a third scan signal, a connection transistor connected between the light-emitting element and a light-emitting element of an adjacent pixel, and a connection control transistor connected between the sensing transistor and the light-emitting element, with a gate electrode configured to receive a third light-emission signal.

The connection transistor may be turned on based on the sensing transistor being turned on, thereby electrically connecting the light-emitting element to the light-emitting element of the adjacent pixel, and the connection control transistor may be turned off based on the sensing transistor being turned on, thereby electrically separating a sensing path via the sensing transistor from a light-emission path via the connection transistor.

The connection transistor may be configured to receive the third scan signal or a fifth scan signal.

The third scan signal and the fifth scan signal may be applied at a turn-off level for one frame based on the pixel being driven in a display driving process and may be applied at a turn-on level for one frame based on the pixel being driven in a sensing driving process.

During a sensing driving process, the sensing transistor may be turned on to output a sensing current including a characteristic value of the driving transistor to the readout line, the connection transistor may be turned on to apply a driving current, which may be applied to the light-emitting element of the adjacent pixel, to the light-emitting element, and the connection control transistor electrically may separate a current path of the sensing current from a current path of the driving current.

The pixel may further include an initialization transistor connected between a reference voltage line and the second node, with a gate electrode configured to receive a second scan signal, a first light-emission transistor connected between the high-potential driving voltage line and the third node, with a gate electrode configured to receive a first light-emission signal, a second light-emission transistor connected between a fourth node, which may be connected to the sensing transistor and the connection control transistor, and the first node, with a gate electrode configured to receive a second light-emission signal, and an anode initialization transistor connected between the light-emitting element and an initialization voltage line, with a gate electrode configured to receive a fourth scan signal.

The pixel may further include a first capacitor connected between the first node and the second node, and a second capacitor connected between the first node and the high-potential driving voltage line.

A display device according to an embodiment may include a display panel including pixels arranged therein, a data driver configured to apply data voltages to the pixels through data lines, a gate driver configured to apply first to fifth scan signals and first to third light-emission signals to the pixels through gate lines and emission lines, and a timing controller configured to control operation timings of the data driver and the gate driver.

Each of the pixels may include a light-emitting element, a driving transistor connected between a first node coupled to the light-emitting element and a third node coupled to a high-potential driving voltage line, with a gate electrode connected to a second node, a switching transistor connected between a data line and the second node, with a gate electrode configured to receive the first scan signal, a sensing transistor connected between the driving transistor and a readout line, with a gate electrode configured to receive the third scan signal, a connection transistor connected between the light-emitting element and a light-emitting element of an adjacent pixel, and configured to receive the third scan signal or the fifth scan signal, and a connection control transistor connected between the sensing transistor and the light-emitting element, with a gate electrode configured to receive the third light-emission signal.

The timing controller may select at least one sensing pixel among the pixels for sensing a characteristic value during one frame, and the gate driver may apply the third scan signal and the fifth scan signal at a turn-on level to the at least one sensing pixel during the one frame.

In the at least one sensing pixel, the sensing transistor may be turned on to output a sensing current, including a characteristic value of the driving transistor, to the readout line, the connection transistor may be turned on to apply a driving current, which is applied to the light-emitting element of an adjacent pixel, to the light-emitting element, and the connection control transistor may electrically separate a current path of the sensing current from a current path of the driving current.

The gate driver may apply the third scan signal and the fifth scan signal at a turn-off level to remaining pixels, which may be not selected as the at least one sensing pixel, during the one frame.

The gate driver may include a plurality of stage circuits connected in cascade, a first switching unit configured to connect a previous stage circuit to either a next-stage circuit or a second-next-stage circuit in response to the third scan signal or the fifth scan signal, and a second switching unit configured to apply the third scan signal or the fifth scan signal to a corresponding stage circuit in response to the third scan signal or the fifth scan signal.

Each of the plurality of stage circuits may include an output terminal configured to output a scan signal or alight-emission signal, a first input terminal configured to receive a start signal or an output signal of a previous stage circuit, and a second input terminal configured to receive the third scan signal or the fifth scan signal.

The first switching unit may connect the output terminal of the previous stage circuit to the first input terminal of the next-stage circuit or the second-next-stage circuit in response to the third scan signal or the fifth scan signal.

The second switching unit may apply the third scan signal or the fifth scan signal to the second input terminal of the corresponding stage circuit in response to the third scan signal or the fifth scan signal.

The first switching unit may include a first switching element connected between the output terminal of the previous stage circuit and the first input terminal of the next-stage circuit, with a gate electrode configured to receive the third scan signal or the fifth scan signal, and a second switching element connected between the output terminal of the previous stage circuit and the first input terminal of the second-next-stage circuit, with a gate electrode configured to receive the third scan signal or the fifth scan signal.

The second switching unit may include a third switching element connected between an output terminal of the third scan signal or the fifth scan signal and the second input terminal of the corresponding stage circuit, with a gate electrode configured to receive the third scan signal or the fifth scan signal.

The first switching unit may further include a first inverting element connected between an output terminal of the third scan signal or the fifth scan signal and the gate electrode of the first switching element.

The first switching element may be an P-type transistor, and the second switching element may be a N-type transistor.

The second switching unit may further include a second inverting element connected between the third switching element and the second input terminal.

The display panel may include a display area where the pixels are arranged, and a non-display area disposed around the display area, wherein the gate driver may include shift registers disposed in the non-display area on both left and right sides of the display area and configured to be symmetrical to each other.

The shift registers may include first to fifth shift registers configured to output the first to fifth scan signals, respectively, and sixth to eighth shift registers configured to output the first to third light-emission signals, respectively, wherein the third shift register and the fifth shift register may be disposed farthest from the display area.

DETAILED DESCRIPTION

Figure 1:
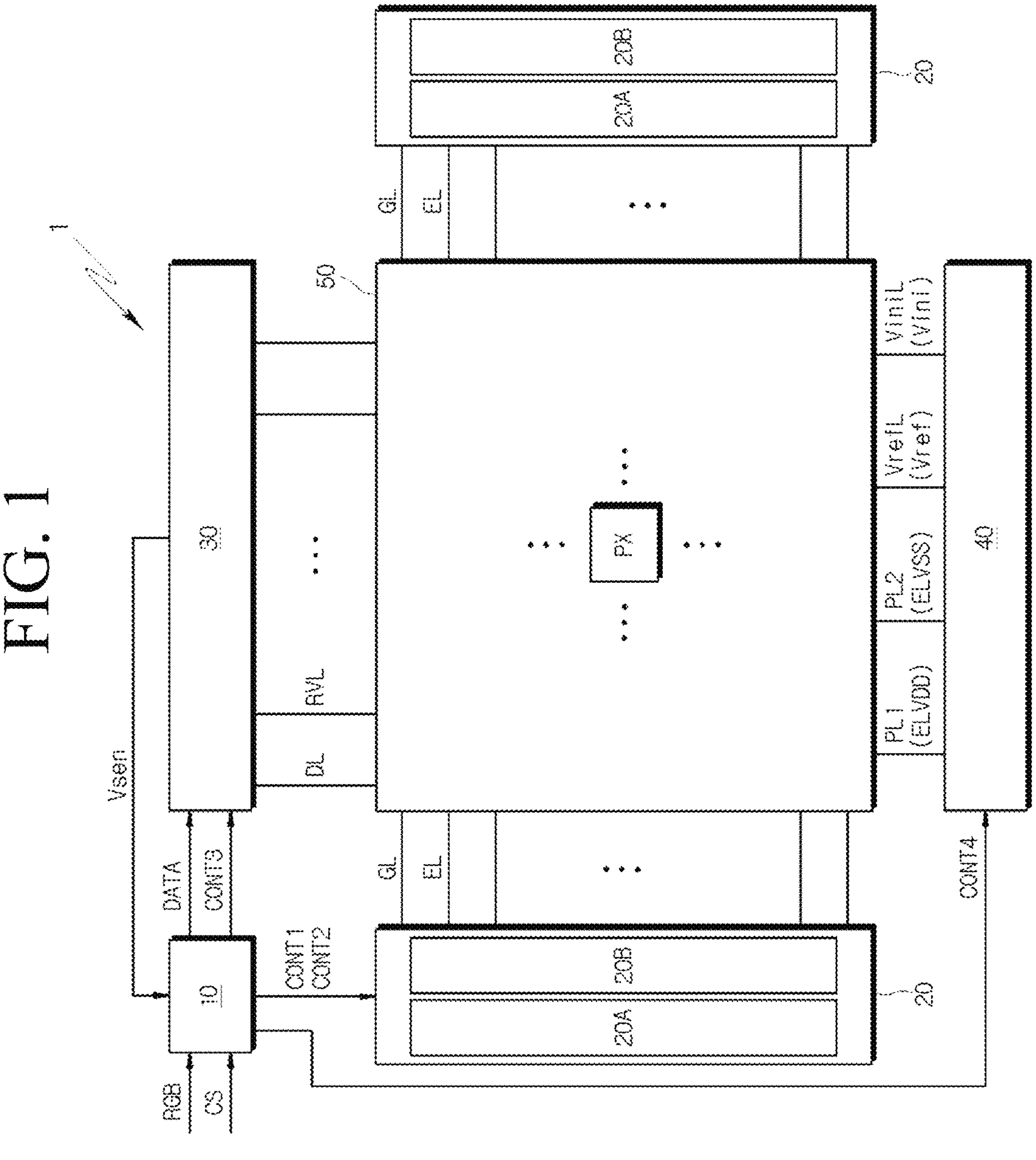
FIG. 1 is a block diagram illustrating the configuration of a display device according to an embodiment.

Hereinafter, embodiments will be described with reference to accompanying drawings. In the specification, when a component (or area, layer, part, etc.) is mentioned as being "on top of," "connected to," or "coupled to" another component, it means that it may be directly connected/coupled to the other component, or a third component may be placed between them.

The same reference numerals refer to the same components. In addition, in the drawings, the thickness, proportions, and dimensions of the components are exaggerated for effective description of the technical content. The expression "and/or" is taken to include one or more combinations that can be defined by associated components.

The terms "first," "second," etc. are used to describe various components, but the components should not be limited by these terms. The terms are used only for distinguishing one component from another component. For example, a first component may be referred to as a second component and, similarly, the second component may be referred to as the first component, without departing from the scope of the present disclosure. The singular forms are intended to include the plural forms as well unless the context clearly indicates otherwise.

The terms such as "below," "lower," "above," "upper," etc. are used to describe the relationship of components depicted in the drawings. The terms are relative concepts and are described based on the direction indicated on the drawing.

It will be further understood that the terms "comprises," "has," and the like are intended to specify the presence of stated features, numbers, steps, operations, components, parts, or a combination thereof but are not intended to preclude the presence or possibility of one or more other features, numbers, steps, operations, components, parts, or combinations thereof.

FIG. 1 is a block diagram illustrating the configuration of a display device according to an embodiment.

With reference to FIG. 1, the display device 1 includes a timing controller 10 (e.g., a circuit), agate driver 20 (e.g., a circuit), a data driver 30 (e.g., a circuit), a power supply unit 40, (e.g., a circuit) and a display panel 50.

The timing controller 10 may control the operation timing of the gate driver 20 and the data driver 30. The timing controller 10 may receive video signals RG B and control signals CS from external host systems or the like. The video signals RGB may include a plurality of grayscale data. The control signals CS may include a horizontal sync signal, a vertical sync signal, and a main clock signal.

The timing controller 10 may process the video signal RGB and control signal CS to be suitable for the operating conditions of the display panel 50 and may generate and output image data DATA, a gate driving control signal CONT1, a light-emission driving control signal CONT2, a data driving control signal CONT3, and a power supply control signal CONT4. The control signal CS may include a data enable signal, horizontal sync signal, vertical sync signal, and main clock. The gate driving control signal CONT1 and/or the light-emission driving control signal CONT2 may include scan timing control signals such as the gate start pulse, gate shift clock, and gate output enable signal. The data driving control signal CONT3 may include data timing control signals such as the source sampling clock, polarity control signal, and source output enable signal.

The timing controller 10 may be placed on a control printed circuit board connected to the source printed circuit board, on which the data driver 30 is bonded, through a connection medium such as flexible flat cable (FFC) or flexible printed circuit (FPC). For example, the timing controller 10 may be connected to the data driver 30 through embedded clock PP interface (EPI) wire pairs to transmit and receive data.

The gate driver 20 may include a scan driving circuit 20A that generates scan signals based on the gate driving control signal CONT1 and the light-emission driving control signal CONT2 input from the timing controller 10. The scan driving circuit 20A may provide the generated scan signals to the pixels PX through a plurality of scan lines GL. In one embodiment, a single pixel PX may be configured to receive a plurality of scan signals having different waveforms. In this case, the scan driving circuit 20A may provide the plurality of scan signals to the pixels PX through corresponding scan lines GL.

The gate driver 20 may further include a light-emission driving circuit 20B that generates light-emission signals based on the gate driving control signal CONT1 and the light-emission driving control signal CONT2 input from the timing controller 10. The light-emission driving circuit 20B may provide the generated light-emission signals to the pixels PX through emission lines EL.

The gate driver 20 may be configured in a Gate In Panel (GIP) form, implemented on the display panel 50. The gate driver 20 may be disposed on one side of the display panel 50 or, as shown in the drawing, on both sides (e.g., left and right side) of the display panel 50. Depending on the driving method, panel design method, etc., the gate driver 20 may be disposed on both sides (e.g., left and right) of the display panel 50, as shown in the drawing, or may be connected to two or more of the four sides of the display panel 50.

The data driver 30 may generate data signals based on the image data DATA and data driving control signal CONT3 output from the timing controller 10. The data driver 30 may provide the generated data signals to the pixels PX through a plurality of data lines DL.

In an embodiment, the data driver 30 may also be further connected to the pixels PX via the readout lines RVL. The data driver 30 may sense the state of the pixels PX based on the electrical signals fed back from the pixels via the readout line RVL. In this embodiment, the timing controller 10 may select a pixel row and/or pixel PX to sense the characteristic values over a predetermined period. The timing controller 10 may control the gate driver 20 to apply a scan signal and/or light-emission signal of a specific level and/or pattern to the selected sensing pixel.

In response to the scan signal and/or light-emission signal, when a sensing signal is output from the pixel PX, the data driver 30 may generate sensing data Vsen based on the sensing signal. Based on the sensing data Vsen acquired through the data driver 30, the timing controller 10 compensates the image data DATA externally to generate the compensated image data DATA. The compensation of the image data DATA may involve compensation for one or more of the threshold voltage, mobility of the driving transistor in the pixel PX, and/or the operating point voltage of the organic light-emitting diode. By supplying the compensated image data DATA to the data driver 30, image quality degradation, such as stains on the display panel 50, may be improved.

The data driver 30 may be implemented as a source drive circuit or a source drive integrated circuit (IC). The data driver 30 may be connected to the bonding pads of the display panel 50 using tape automated bonding (TA B) or chip on glass (COG) methods, or directly arranged on the display panel 50, and in some cases, it may be integrated and arranged within the display panel 50.

The power supply unit 40 may generate high-potential driving voltage ELVDD and low-potential driving voltage ELVSS to be provided to the display panel 50 based on the power supply control signal CONT4. The power supply unit 40 may provide the generated driving voltages ELVDD and ELVSS to the pixels PX through the corresponding voltage lines PL1 and PL2. Additionally, the power supply 40 may generate reference voltage Vref and initialization voltage Vini required for driving the pixels PX, and provide them to the pixels PX through the corresponding voltage lines VrefL and ViniL. Such a power supply unit 40 may be referred to as a power management IC (PMIC).

The display panel 50 includes a plurality of pixels PX (or sub-pixels) arranged thereon. The pixels PX may be arranged in a matrix form on the display panel 50, for example. The pixels PX arranged in a single pixel row are connected to the same scan line GL and emission line EL, and the pixels PX arranged in a single pixel column are connected to the same data line DL. The pixels PX may emit light with a brightness corresponding to the scan signals and data signals supplied through the scan line GL and data line DL in response to the light-emission signals applied through the emission line EL.

In one embodiment, each pixel PX may display one of the colors, red, green, or blue. In another embodiment, each pixel PX may display one of the colors, cyan, magenta, or yellow. In various embodiments, each pixel PX may display one of the colors, red, green, blue, or white.

Figure 2:
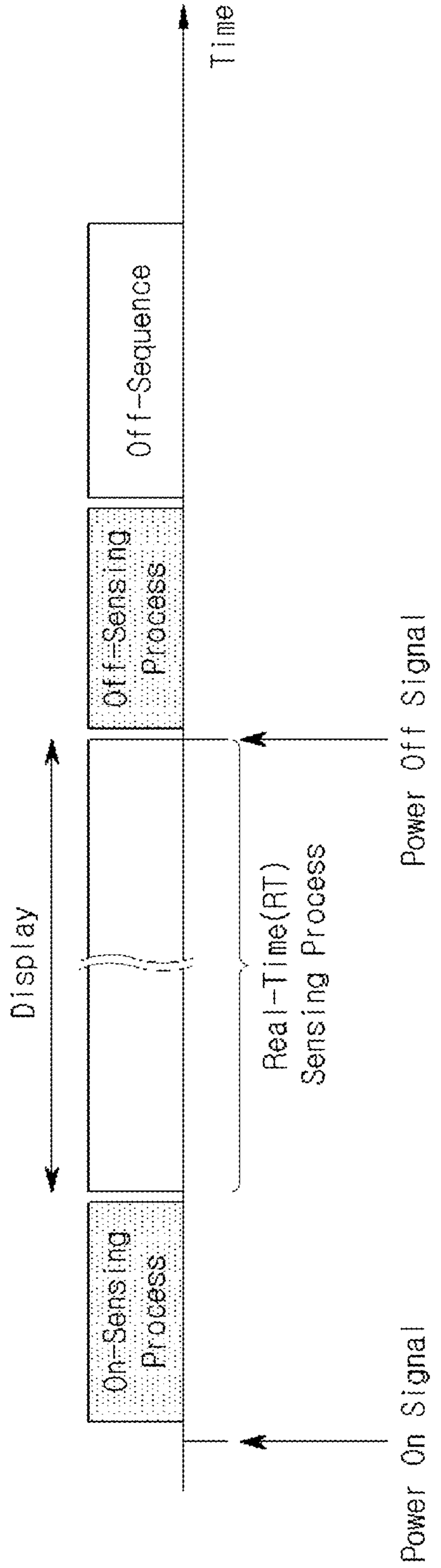
FIG. 2 is a diagram illustrating external compensation sensing timing according to an embodiment.

FIG. 2 is a diagram illustrating external compensation sensing timing according to an embodiment;

Referring to FIGS. 1 and 2, the display device 1 according to an embodiment may sense the characteristic values of the driving transistors in each pixel PX arranged on the display panel 50 when a power-on signal is generated. This sensing process is referred to as the "on-sensing process."

Additionally, when a power-off signal is generated before the initiation of the off-sequence such as power shutdown, the display device 1 may also sense the characteristic values of the driving transistors within each pixel PX arranged on the display panel 50. This sensing process is referred to as the "off-sensing process."

Additionally, the display device 1 may sense the characteristic values of the driving transistors in each pixel PX arranged on the display panel 50 during display driving, from the time the power-on signal is generated until the power-off signal is generated. This real-time sensing process is referred to as "real-time sensing process." The real-time sensing process may be carried out during the blank time between active periods, based on the vertical sync signal.

Alternatively, the real-time sensing process may be performed while images are being displayed on each pixel PX of the display panel 50. In this embodiment, each pixel PX may be configured to separate the electrical path for displaying the image from the electrical path for sensing the characteristic values of the pixel PX. Hereinafter, the structure of such pixels PX will be described in detail.

Figure 3:
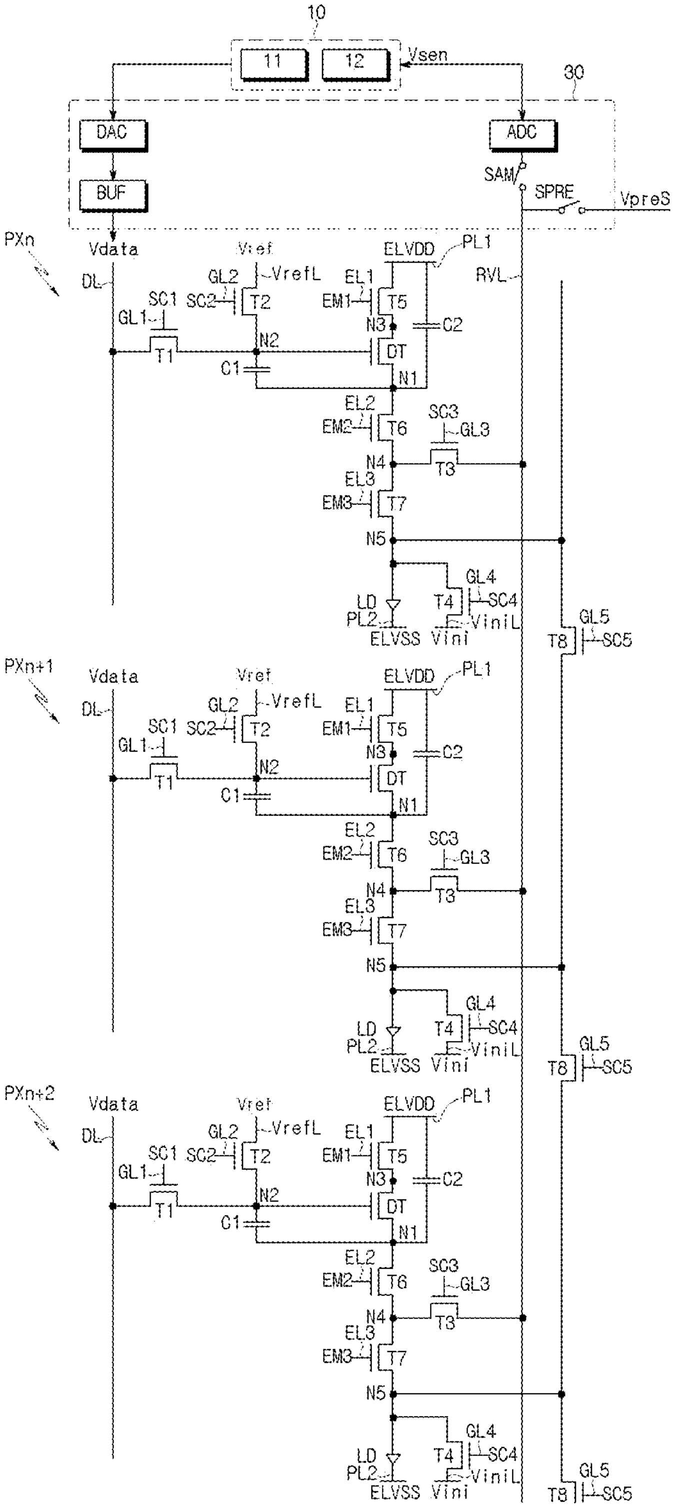
FIG. 3 is a diagram illustrating the connection relationship between a pixel, a data driver, and a timing controller according to a first embodiment.

FIG. 3 is a diagram illustrating the connection relationship between a pixel, a data driver, and a timing controller according to an embodiment. In FIG. 3, for convenience of explanation, three pixels PXn, PXn+1, and PXn+2 arranged in the nth (n is a natural number) to the (n+2)th pixel rows are illustrated.

Referring to FIG. 3, each of the pixels PXn, PXn+1, PXn+2 according to an embodiment may include a driving transistor DT, alight-emitting element LD connected to the driving transistor DT, and a control circuit for controlling the amount of driving current to be applied to the light-emitting element LD through the driving transistor DT. For example, the control circuit may include transistors T1 to T8 and capacitors C1 and C2.

The first electrode of the driving transistor DT is configured to receive the high-potential driving voltage ELVDD through the third node N3 (connected to the high-potential driving voltage line PL1), and the second electrode is connected to the first node N1. The gate electrode of the driving transistor DT is connected to the second node N2. The driving transistor DT may be turned on according to the voltage applied to the second node N2, thereby controlling the amount of driving current flowing to the light-emitting element LD.

The first electrode of the first transistor T1 is connected to the data line DL, and the second electrode is connected to the gate electrode of the driving transistor DT through the second node N2. The gate electrode of the first transistor T1 is connected to the first scan line GL1 and may receive the first scan signal SC1. The first transistor T1 may be turned on according to the first scan signal SC1 applied to the first scan line GL1 and transmit the data voltage Vdata applied to the data line DL to the second node N2. The first transistor T1 may be referred to as a switching transistor.

The first electrode of the second transistor T2 is configured to receive the reference voltage Vref (connected to the reference voltage line VrefL), and the second electrode is connected to the second node N2. The gate electrode of the second transistor T2 is connected to the second scan line GL2 and may receive the second scan signal SC2. The second transistor T2 may be turned on according to the second scan signal SC2 applied to the second scan line GL2 and transmit the reference voltage Vref to the second node N2. This second transistor T2 may be referred to as an initialization transistor. In one embodiment, the second transistor T2 may be omitted.

The first electrode of the third transistor T3 is connected to the readout line RVL, and the second electrode is connected to the fourth node N4. The gate electrode of the third transistor T3 is connected to the third scan line GL3 and may receive the third scan signal SC3. The third transistor T3 may be turned on according to the third scan signal SC3 applied to the third scan line GL3, and output an electrical signal (such as current or voltage) applied to the fourth node N4, that is, a sensing signal containing the characteristic value of the driving transistor DT, to the readout line RVL. This third transistor T3 may be referred to as a sensing transistor. When the sixth transistor T6 is omitted, the third transistor T3 may be connected to the first node N1.

The first electrode of the fourth transistor T4 is connected to the light-emitting element LD through the fifth node N5, and the second electrode may be configured to receive the initialization voltage Vini (connected to the initialization voltage line ViniL). The gate electrode of the fourth transistor T4 is connected to the fourth scan line GL4 and may receive the fourth scan signal SC4. The seventh transistor T7 may apply the initialization voltage Vini to the anode electrode of the light-emitting element LD in response to the fourth scan signal SC4 applied to the fourth scan line GL4.

This fourth transistor T4 may be referred to as the anode initialization transistor. In one embodiment, the fourth transistor T4 may be omitted.

The first electrode of the fifth transistor T5 is configured to receive the high-potential driving voltage ELVDD (connected to the high-potential driving voltage line PL1), and the second electrode is connected to the driving transistor DT through the third node N3. The gate electrode of the fifth transistor T5 is connected to the first emission line EL1 and may receive the first light-emission signal EM1. The fifth transistor T5 may connect the high-potential driving voltage line PL1 and the driving transistor DT in response to the first light-emission signal EM1 applied to the first emission line EL1.

The first electrode of the sixth transistor T6 is connected to the driving transistor DT through the first node N1, and the second electrode is connected to the fourth node N4. The gate electrode of the sixth transistor T6 is connected to the second emission line EL2 and may receive the second light-emission signal EM2. The sixth transistor T6 may connect the driving transistor DT and the fourth node N4 in response to the second light-emission signal EM2 applied to the second emission line EL2.

The first electrode of the seventh transistor T7 is connected to the fourth node N4, and the second electrode is connected to the light-emitting element LD through the fifth node N5. The gate electrode of the seventh transistor T7 is connected to the third emission line EL3 and may receive the third light-emission signal EM3. The seventh transistor T7 may connect the driving transistor DT and the light-emitting element LID in response to the third light-emission signal EM3 applied to the third emission line EL3.

When the fifth transistor T5, sixth transistor T6, and seventh transistor T7 are turned on, a current path is formed between the high-potential driving voltage ELVDD and the low-potential driving voltage ELVSS, allowing the driving current to flow to the light-emitting element LID, thereby enabling the light-emitting element LID to emit light. These fifth transistor T5, sixth transistor T6, and seventh transistor T7 may be referred to as light-emission transistors.

In one embodiment, the fifth transistor T5 and sixth transistor T6 may be omitted. In this embodiment, the seventh transistor T7 may be connected between the light-emitting element LD and the first node N1.

In one embodiment, the seventh transistor T7 operates to separate the sensing path, which passes through the third transistor T3 of the pixel PX, and the light-emitting path, which passes through the eighth transistor T8, and may be referred to as a connection control transistor.

The first electrode of the eighth transistor T8 is connected to the light-emitting element LD through the fifth node N5, and the second electrode may be connected to the fifth node N5 of the pixels PXn, PXn+1, and PXn+2 arranged in the adjacent pixel row, for example, the next pixel row. The gate electrode of the eighth transistor T8 is connected to the fifth scan line GL5 and may receive the fifth scan signal SC5. The fifth scan signal SC5 may have the same waveform as the third scan signal SC3, but this is not limited thereto.

The eighth transistor T8 may connect the anode electrode of the light-emitting element LD to the anode electrode of the light-emitting element LD in the pixels PXn, PXn+1, and PXn+2 arranged in the adjacent pixel row, in response to the fifth scan signal SC5 applied to the fifth scan line GL5. This eighth transistor T8 may be referred to as a connection transistor. The eighth transistor T8 may be turned on while the third transistor T3 is turned on and the driving transistor DT is connected to the readout line RVL.

The first capacitor C1 is connected between the first node N1 and the second node N2. The first capacitor C1 may store a voltage corresponding to the voltage difference between the first node N1 and the second node N2. For example, the first capacitor C1 may store a voltage corresponding to the voltage difference between the data voltage Vdata applied to the data line DL and the voltage at the second node N2, and maintain the stored voltage throughout a frame period, thereby stabilizing the voltage at the gate electrode of the driving transistor DT (i.e., the second node N2).

The second capacitor C2 is connected between the high-potential driving voltage ELVDD and the first node N1. The second capacitor C2 may store a voltage corresponding to the voltage difference between the high-potential driving voltage ELVDD and the first node N1.

The light-emitting element LD may have its anode electrode connected to the fifth node N5 and its cathode electrode connected to the low-potential driving voltage ELVSS. When the driving transistor DT, fifth transistor T5, and sixth transistor T6, and the seventh transistor T7 are turned on, a current path is formed between the high-potential driving voltage ELVDD and the low-potential driving voltage ELVSS, allowing the driving current to flow to the light-emitting element LD. The light-emitting element LD may emit light with brightness corresponding to the amount of applied driving current.

In the embodiment illustrated in FIG. 3, the pixels PXn, PXn+1, and PXn+2 may include an oxide semiconductor thin-film transistor. The oxide semiconductor thin-film transistor includes a gate electrode, a source electrode, and a drain electrode. The oxide semiconductor thin-film transistor has an active layer formed of oxide semiconductor material. H ere, the oxide semiconductor may be set as either an amorphous or crystalline oxide semiconductor. The oxide semiconductor thin-film transistor may be configured as an N-type transistor. The oxide semiconductor thin-film transistor is capable of being processed at low temperatures and has a lower charge mobility compared to LTPS (Low Temperature Poly-Silicon) thin-film transistors. Such oxide semiconductor thin-film transistors have excellent off-state current characteristics.

However, this embodiment is not limited thereto. In various other embodiments, the pixel PX may be fully made up of LTPS thin-film transistors or configured as a hybrid type having both oxide thin-film transistors and LTPS thin-film transistors.

LTPS thin-film transistors include a gate electrode, a source electrode, and a drain electrode. The LTPS thin-film transistor has an active layer formed of polysilicon. Such LTPS thin-film transistors may be configured as P-type thin-film transistors. LTPS thin-film transistors have high electron mobility, providing fast driving characteristics.

The timing controller 10 may include a compensation unit 11 (e.g., a circuit) that performs a compensation process to compensate for the characteristic values of the pixel PX based on the sensing data (Vsen) obtained through the sensing of the pixel PX, and a memory 12 that stores the compensation values generated by the compensation unit 11. The compensation unit 11 and the memory 12 may be provided within the timing controller 10, but is not limited thereto.

The data driver 30 may further include an analog-to-digital converter ADC that converts the voltage measured through the readout line RVL into digital data, a sampling switch SAM that controls the connection between the analog-to-digital converter ADC and the readout line RVL, and an initialization switch SPRE that controls the connection between the readout line RVL and the sensing reference voltage VpreS.

The initialization switch SPRE may control the voltage application state of the fourth node N4 so that the voltage state reflects the characteristic values of the desired circuit elements within the pixel PX. When the initialization switch SPRE is turned on, the sensing reference voltage VpreS may be supplied to the readout line RVL and applied to the fourth node N4 through the turned-on third transistor T3.

The sampling switch SAM is turned on and electrically connects the readout line RVL and the analog-to-digital converter ADC. The sampling switch SAM may be controlled to turn on when the voltage at the fourth node N4 of the pixel PX reflects the characteristic values of the desired circuit elements. When the sampling switch SAM is turned on, the analog-to-digital converter ADC converts the voltage of the connected readout line RVL into digital data to generate the sensing data Vsen, which is then transmitted to the compensation unit 11 and/or the memory 12 in the timing controller 10.

The analog-to-digital converter ADC, sampling switch SAM, and initialization switch SPRE may be provided within the data driver 30, but this is not limited thereto.

The compensation unit 11 may determine the characteristic values (e.g., threshold voltage, mobility, etc.) of the circuit elements (e.g., driving transistor DT and/or light-emitting element LD) within the pixel PX based on the sensing data Vsen, and perform an external compensation process for those characteristic values.

Specifically, the compensation unit 11 may calculate compensation values (e.g., offset, gain, etc.) for characteristic value compensation based on the sensing data Vsen, and store the calculated compensation values in the memory 12 and/or transmit them to the data driver 30. The data driver 30 may supply the data voltage Vdata, with the applied compensation values, to the respective pixel PX through the data supply unit. The data supply unit may convert the compensated image data into an analog signal form of data voltage Vdata through a digital-to-analog converter DAC, and output the data voltage Vdata to the respective data line DL via the output buffer BUF. By compensating the pixel characteristic values in this manner, the luminance variation between pixels PX may be reduced, resulting in improved image quality.

Figure 4:
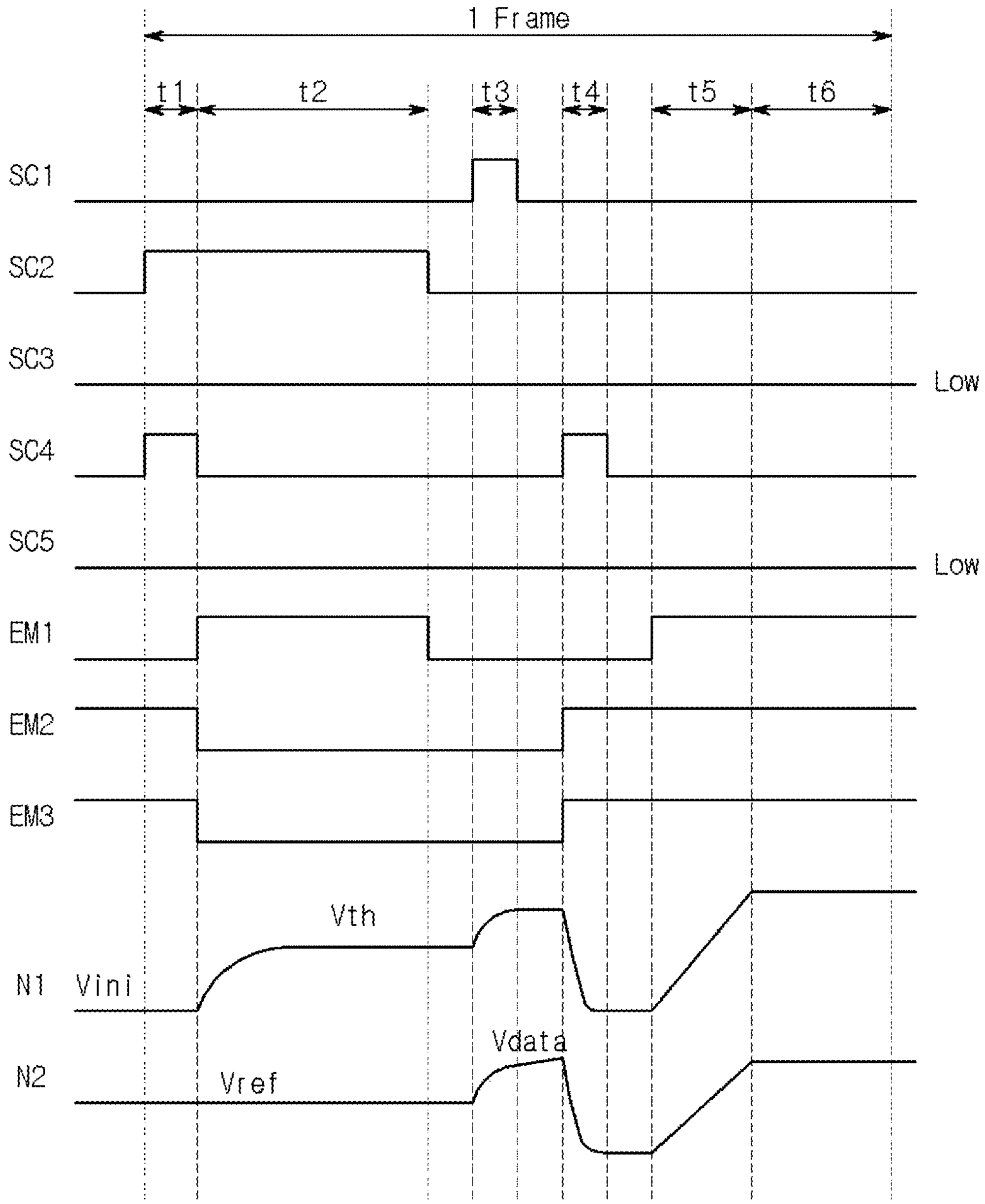
FIG. 4 is a timing diagram illustrating a pixel driving method according to an embodiment.

FIG. 4 is a timing diagram illustrating a pixel driving method according to an embodiment. FIGS. 5 to 10 are diagrams illustrating the steps of the pixel driving method according to FIG. 4. In detail, FIGS. 4 to 10 illustrate the driving method of the pixels PXn and PXn+2 arranged in the nth and (n+2)th pixel rows during the display driving process. In FIGS. 4 to 10, the pixels PXn and PXn+2 arranged in the nth and (n+2)th pixel rows are driven in the display mode.

Referring to FIGS. 3 and 4 together, for the pixels PXn and PXn+2 driven in the display mode, one frame 1 Frame may include an initialization period t1, a sampling period t2, a programming period t3, an anode initialization period t4, a boosting period t5, and a light emission period t6. During the initialization period t1, the pixels PXn and PXn+2 are initialized, and during the sampling period t2, the threshold voltage Vth of the driving transistor DT is sampled and stored in the first capacitor C1. During the programming period t3, the data voltage Vdata is applied to the second node N2, and during the anode initialization period t4, the anode electrode of the light-emitting element LD may be initialized. During the boosting period t5, the voltage of the anode electrode is boosted, and during the light emission period t6, the light-emitting element LD may emit light with a luminance corresponding to the data voltage Vdata.

During one frame of the pixels PXn and PXn+2 driven in the display mode, the third scan signal SC3 and fifth scan signal SC5 are applied at the turn-off level. Therefore, the third transistor T3 and eighth transistor T8 are maintained in the turn-off state. That is, the pixels PXn and PXn+2 are separated from the readout line RVL and are isolated from the anode electrode of the adjacent pixel PXn+1.

Figure 5:
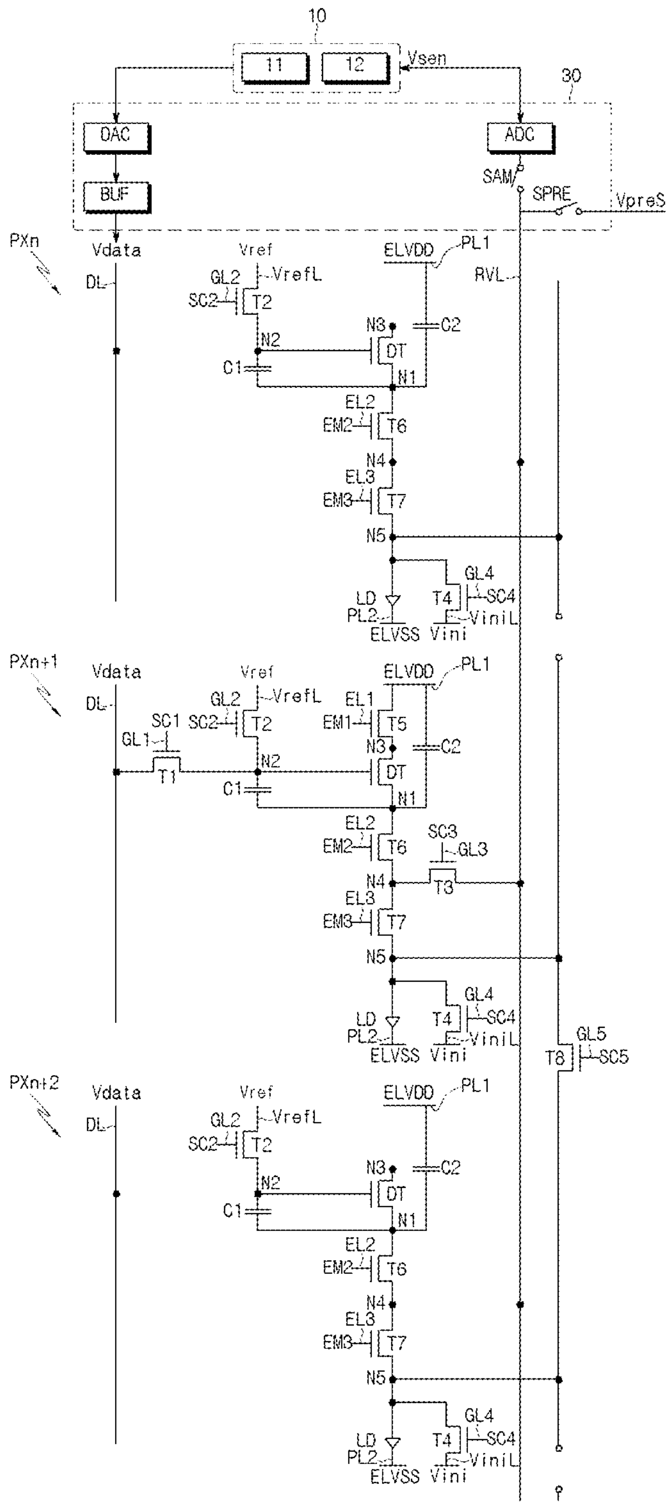
FIGS. 5 to 10 are diagrams illustrating the steps of the pixel driving method according to FIG. 4 according to an embodiment.

Referring to FIG. 5, during the initialization period t1, the second scan signal SC2, the fourth scan signal SC4, the second light-emission signal EM2, and the third light-emission signal EM3 at the turn-on level (e.g., high level) may be applied. As a result, the second transistor T2, the fourth transistor T4, the sixth transistor T6, and the seventh transistor T7 may be turned on.

When the reference voltage Vref is applied to the second node N2 through the turned-on second transistor T2, the gate electrode of the driving transistor DT may be initialized to the reference voltage Vref. The reference voltage Vref may be a low-level positive voltage and may correspond to a black luminance voltage, but this is not limited thereto.

When the initialization voltage Vini is applied to the fifth node N5 through the turned-on fourth transistor T4, the anode electrode of the light-emitting element LD may be initialized to the initialization voltage Vini through the turned-on fourth transistor T4. The initialization voltage Vini may be the same as or different from the reference voltage Vref. For example, the initialization voltage Vini may be lower than the reference voltage Vref, but this is not limited thereto.

Through the turned-on sixth transistor T6 and the turned-on seventh transistor T7, the initialization voltage Vini may also be further applied to the first node N1. As a result, the source electrode of the driving transistor DT may be initialized to the initialization voltage Vini.

Figure 6:
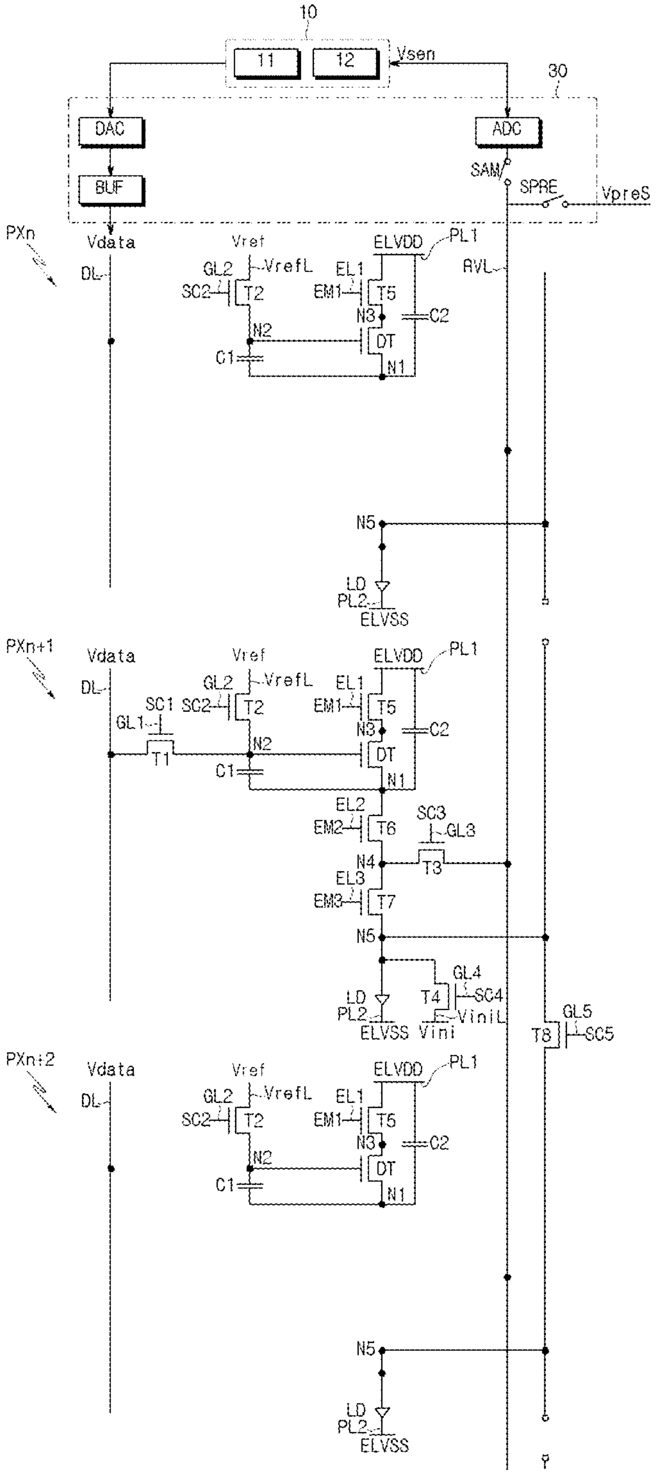

Referring to FIG. 6, during the sampling period t2, the fourth scan signal SC4, the second light-emission signal EM2, and the third light-emission signal EM3 may be switched to the turn-off level (e.g., low level). Additionally, the first light-emission signal EM1 at the turn-on level may be applied. As a result, the fourth transistor T4, the sixth transistor T6, and the seventh transistor T7 are turned off, and the fifth transistor T5 may be turned on.

When the high-potential driving voltage ELVDD is applied to the third node N3 through the turned-on fifth transistor T5, the high-potential driving voltage ELVDD may be applied to the drain electrode of the driving transistor DT. The reference voltage Vref is applied to the gate electrode of the driving transistor DT through the second transistor T2. The source electrode of the driving transistor DT becomes a voltage-variable state.

As a result, during the sampling period t2, the driving transistor DT may be turned on and operate in a source follower manner. That is, the driving transistor DT may supply drain-source current to the first node N1 until the gate-source voltage reaches the threshold voltage Vth of the driving transistor DT. The voltage at the first node N1 gradually increases from the initialization voltage Vini and may converge to the voltage Vref−Vth, corresponding to the difference between the reference voltage Vref and the threshold voltage Vth.

The first capacitor C1 stores a voltage corresponding to the difference between the voltage at the second node N2 and the voltage at the first node N1. After the driving transistor DT is saturated, the first capacitor C1 may store the gate-source voltage, which is the threshold voltage Vth, of the driving transistor DT.

The second capacitor C2 stores a voltage corresponding to the difference between the voltage at the first node N1 and the high-potential driving voltage ELVDD. After the driving transistor DT is saturated, the second capacitor C2 may store a voltage corresponding to the difference between the high-potential driving voltage ELVDD and the voltage at the first node N1 (Vref−Vth), which is ELVDD-Vref+Vth.

Figure 7:
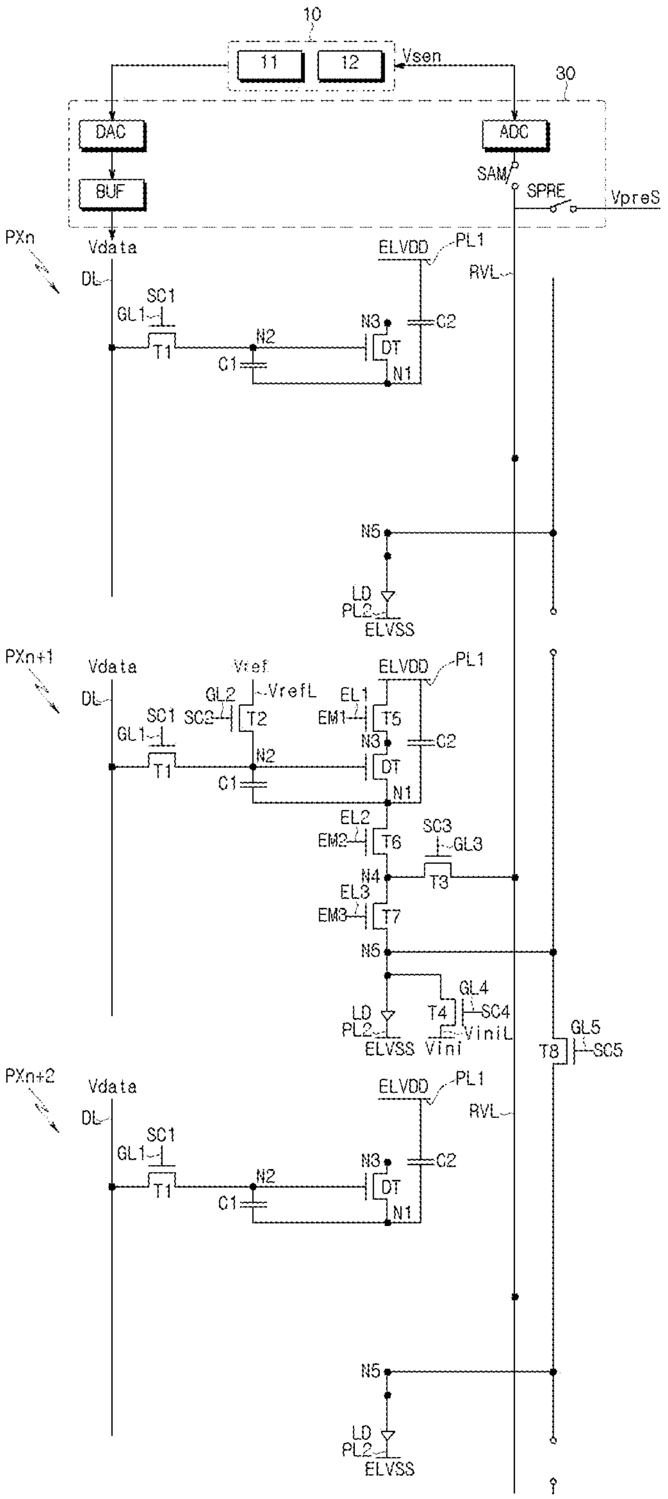

Referring to FIG. 7, during the programming period t3, the second scan signal SC2 and the first light-emission signal EM1 may be switched to the turn-off level (e.g., low level). Additionally, the first scan signal SC1 at the turn-on level may be applied. As a result, the second transistor T2 and the fifth transistor T5 are turned off, and the first transistor T1 may be turned on.

When the data voltage Vdata is applied to the second node N2 through the turned-on first transistor T1, the data voltage Vdata may be applied to the gate electrode of the driving transistor DT. The voltage at the gate electrode of the driving transistor DT rises to a voltage corresponding to the data voltage Vdata, and the source voltage of the diode-connected driving transistor DT is boosted in response to the rise in the gate electrode voltage.

Figure 8:
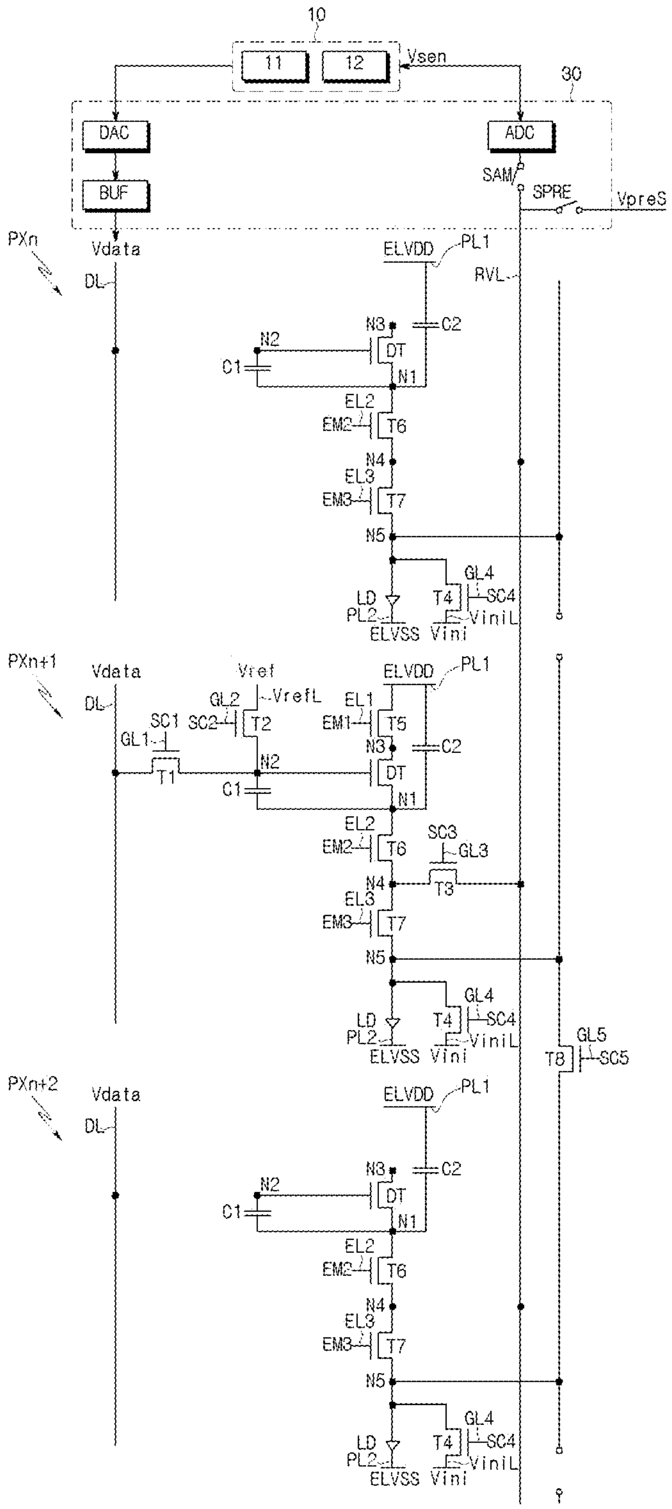

Referring to FIG. 8, during the anode initialization period t4, the first scan signal SC1 is switched to the turn-off level. At the same time, the fourth scan signal SC4, the second light-emission signal EM2, and the third light-emission signal EM3 at the turn-on level may be applied. As a result, the first transistor T1 is turned off, and the fourth transistor T4, the sixth transistor T6, and the seventh transistor T7 may be turned on.

When the initialization voltage Vini is applied to the fifth node N5 through the turned-on fourth transistor T4, the anode electrode of the light-emitting element LD may be initialized to the initialization voltage Vini through the turned-on fourth transistor T4.

Through the turned-on sixth transistor T6 and the turned-on seventh transistor T7, the initialization voltage Vini may also be further applied to the first node N1. As a result, the source electrode of the driving transistor DT may be initialized to the initialization voltage Vini. At this point, instead, the voltage at the gate electrode of the driving transistor DT is maintained at the voltage programmed during the previous period, due to the first capacitor C1 and the second capacitor C2.

Figure 9:
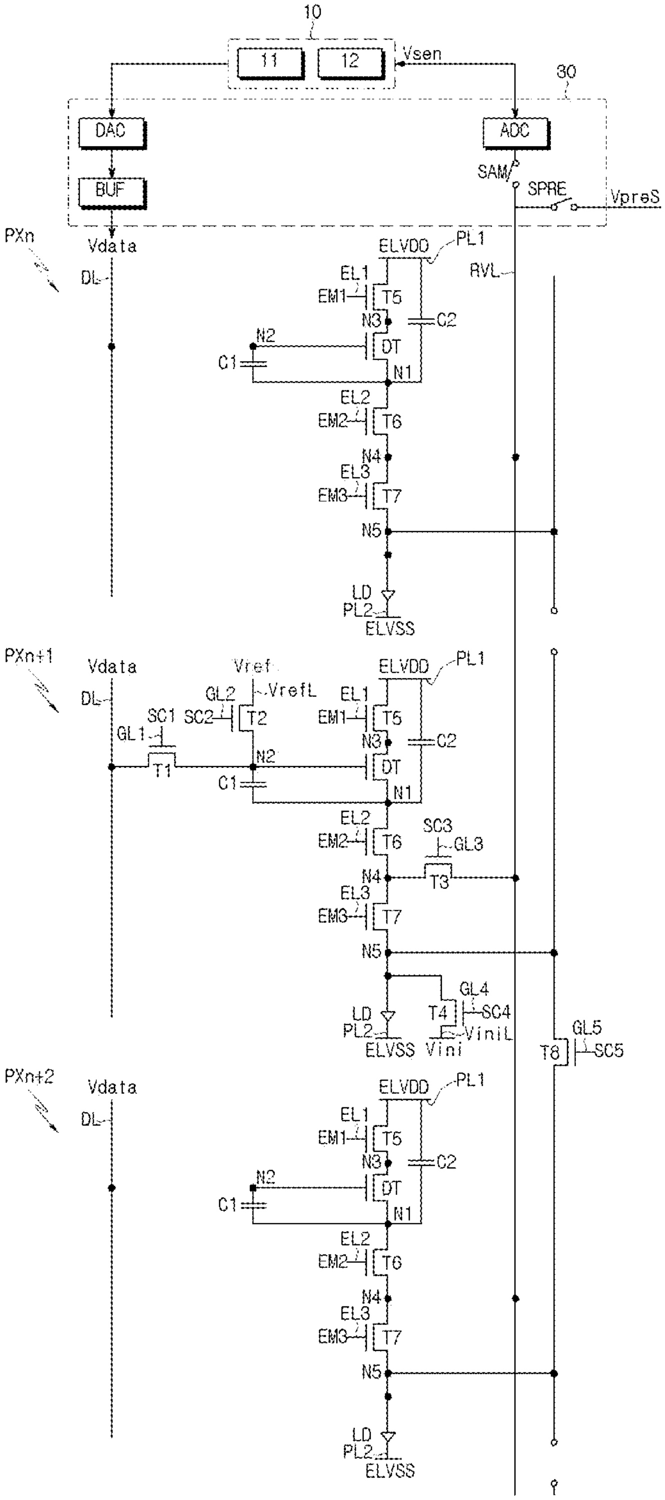

Referring to FIG. 9, during the boosting period t5, the fourth scan signal SC4 is switched to the turn-off level, and the first light-emission signal EM1 is switched to the turn-on level. As a result, the fourth transistor T4 is turned off, and the fifth transistor T5 is further turned on.

Through the turned-on fifth to seventh transistors (T5, T6, T7), a current path is formed from the high-potential driving voltage ELVDD, through the driving transistor DT, to the light-emitting element LD. As a result, during the boosting period t5, the voltage at the first node N1 and the second node N2 rises to the turn-on voltage of the light-emitting element LD.

Figure 10:
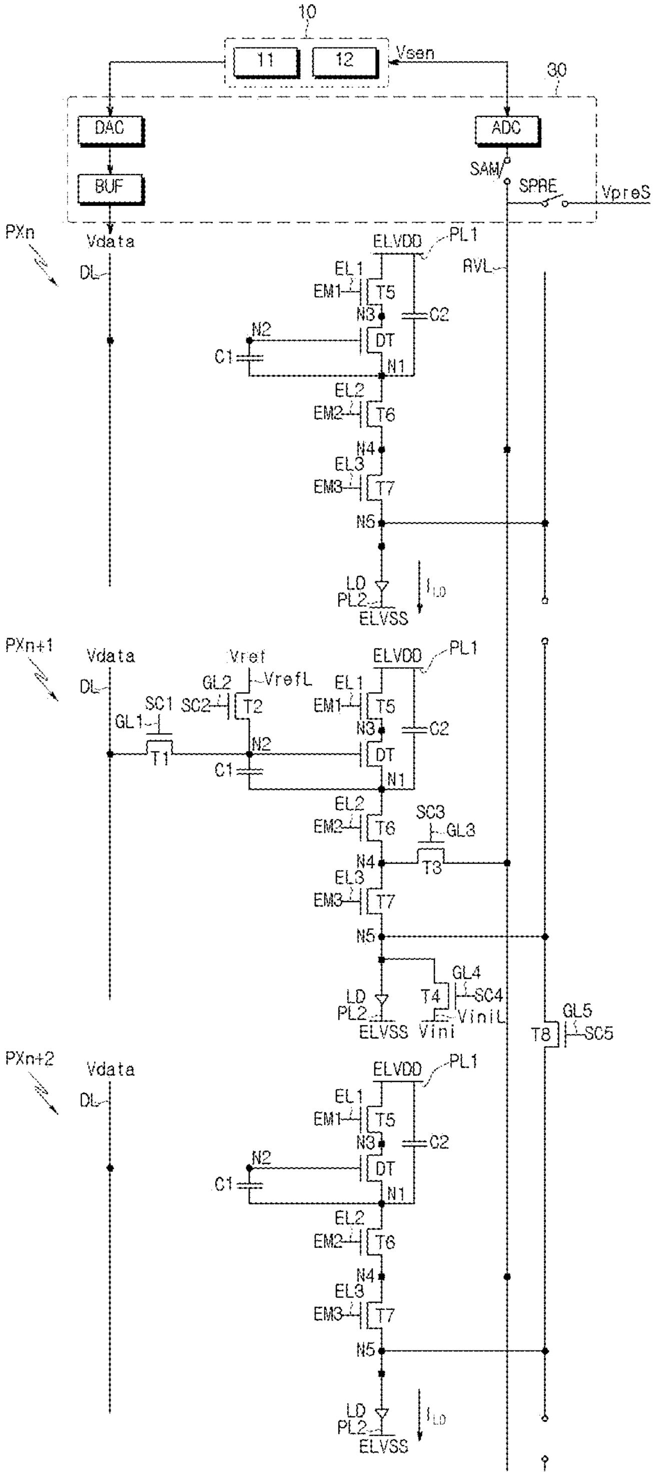

Referring to FIG. 10, during the light emission period t6, the turned-on light-emitting element LD may emit light with a luminance corresponding to the programmed voltage. Here, the voltage programmed in the driving transistor DT is the voltage programmed in the first capacitor C1, which is the voltage of the data voltage Vdata internally compensated by the threshold voltage Vth. Therefore, the degradation of the driving transistor DT may be compensated.

Figure 11:
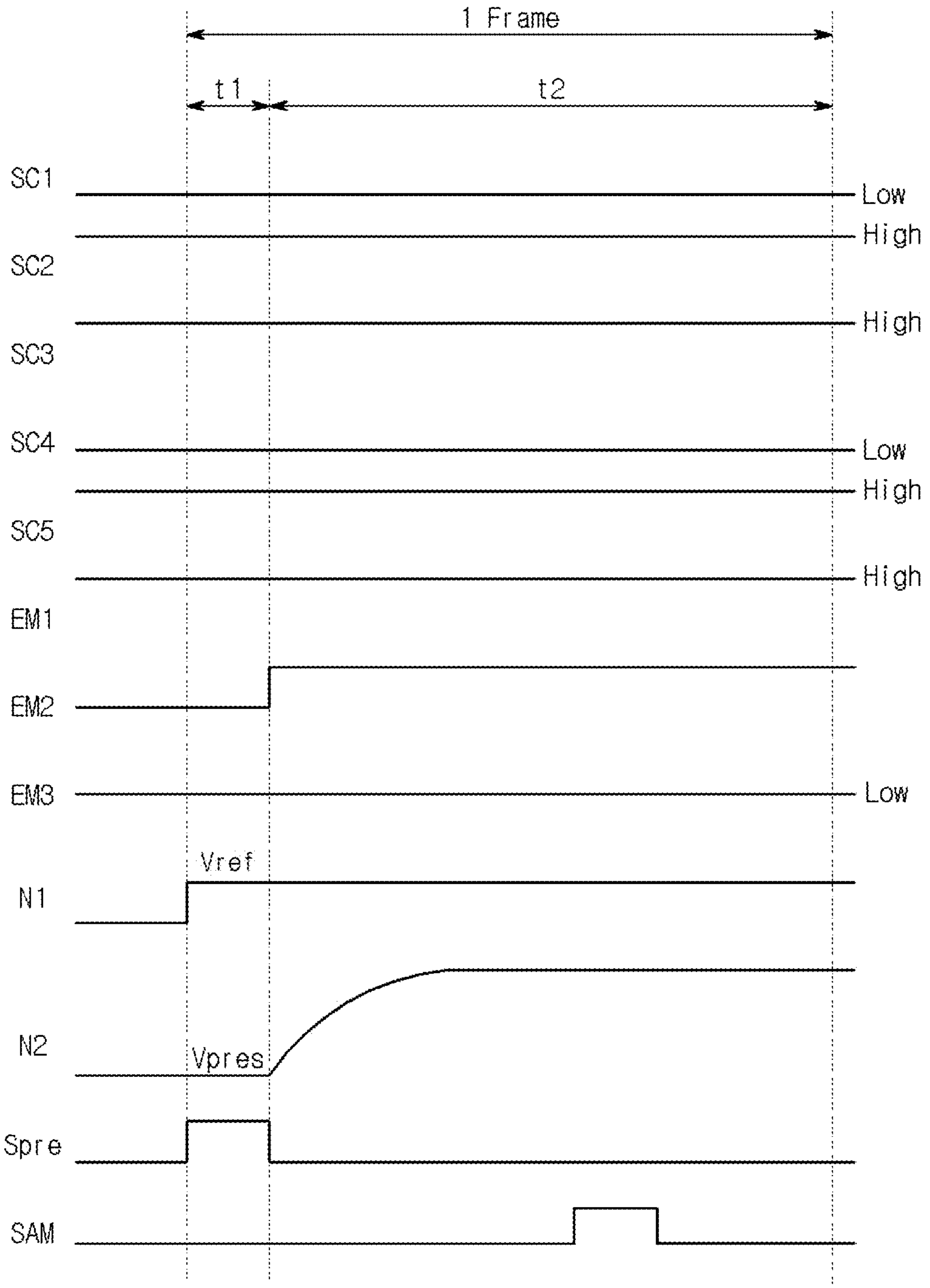
FIG. 11 is a timing diagram illustrating a pixel driving method according to another embodiment.
Figure 12:
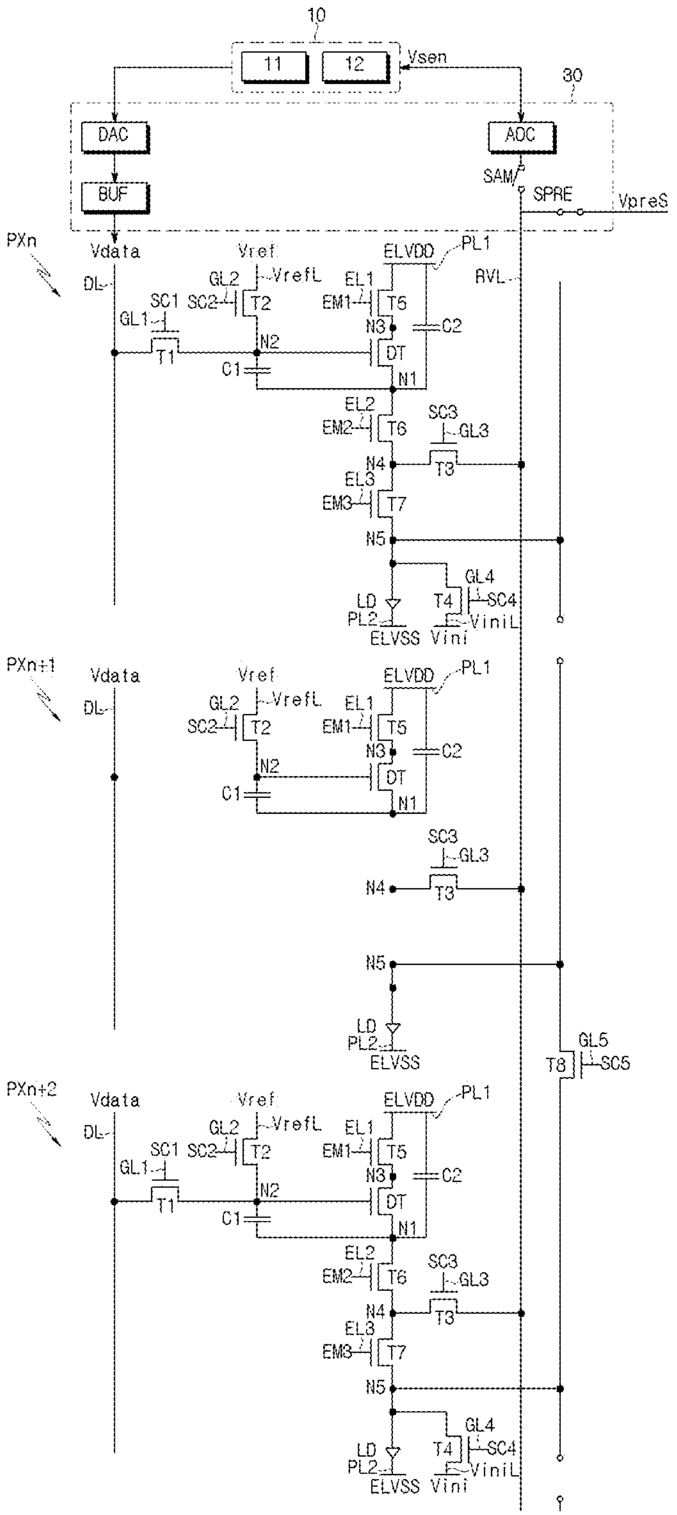
FIGS. 12 and 13 are diagrams illustrating the steps of the pixel driving method according to FIG. 11 according to an embodiment.
Figure 13:
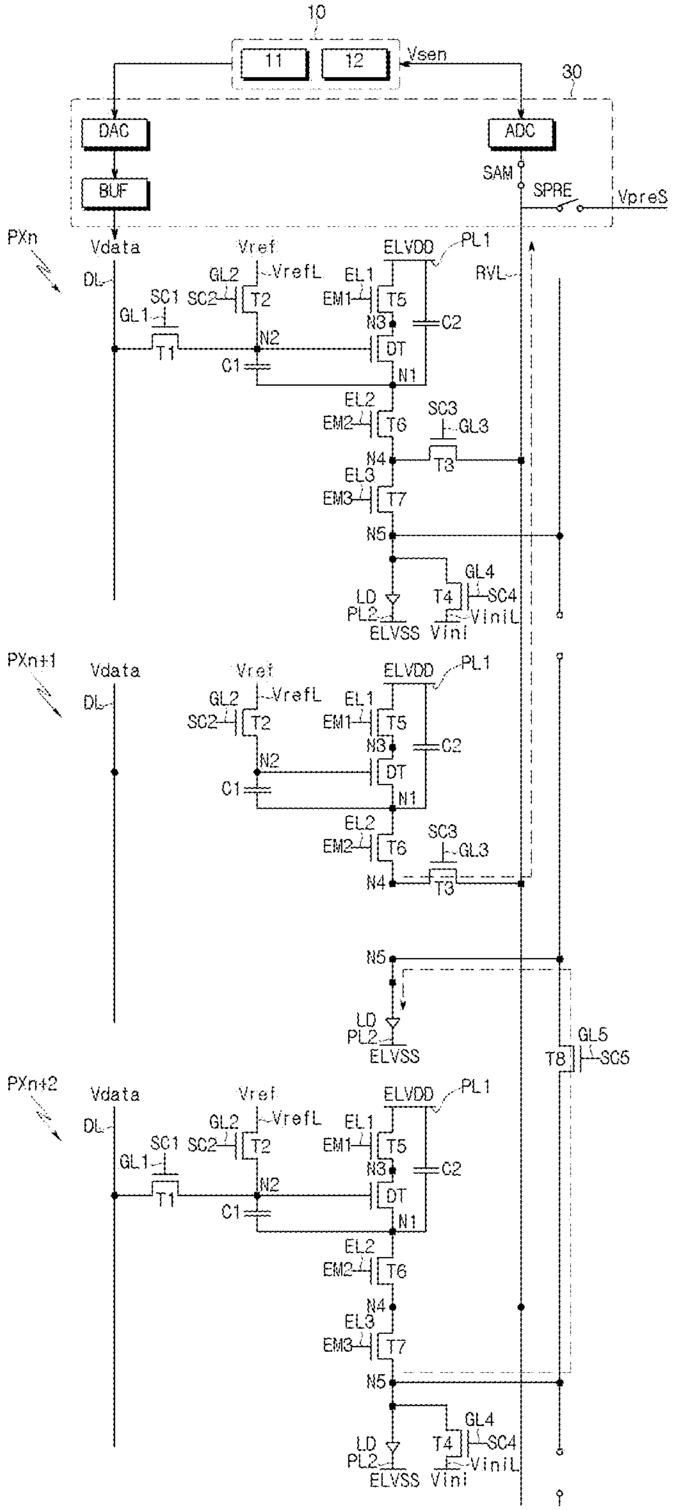

FIG. 11 is a timing diagram illustrating a pixel driving method FIGS. 12 and 13 are diagrams illustrating the steps of the pixel driving method according to FIG. 11. Specifically, FIGS. 11 to 13 illustrate the driving method of pixels PXn+1 arranged in the (n+1)-th pixel row in the display driving process. In FIGS. 11 to 13, the pixels PXn+1 arranged in the (n+1)-th pixel row are driven in sensing mode.

Referring to FIGS. 3 and 11 together, for the pixels PXn+1 driven in sensing mode, one frame 1 Frame may include an initialization period t1 and a sensing period t2. During the initialization period t1, the pixel PXn+1 is initialized, and during the sensing period t2, the characteristic value of the pixel PXn+1 may be sensed.

During one frame 1 Frame of the pixels PXn+1 driven in sensing mode, the third scan signal SC3 and the fifth scan signal SC5 may be applied at the turn-on level. Thus, the third transistor T3 and the eighth transistor T8 remain in the turn-on state. That is, the pixel PXn+1 is in a connected state with the readout line RVL and connected to the anode electrode of the adjacent pixel PXn+2.

Additionally, during one frame 1 Frame of the pixels PXn+1 driven in sensing mode, the third light-emission signal EM3 may be applied at the turn-off level. Thus, the seventh transistor T7 remains in the turn-off state. That is, the pixel PXn+1 is in a state where the electrical path across the seventh transistor T7 is separated.

Furthermore, during one frame 1 Frame of the pixels PXn+1 driven in sensing mode, the first scan signal SC1 and the fourth scan signal SC4 may be applied at the turn-off level, and the second scan signal SC2 and the first light-emission signal EM1 may be applied at the turn-on level. The second light-emission signal EM2 may be applied at the turn-off level during the initialization period t1 and at the turn-on level during the sensing period t2.

Referring to FIG. 12, during the initialization period t1, the second scan signal SC2 and the first light-emission signal EM1 at the turn-on level may be applied. Accordingly, the second transistor T2 and the fifth transistor T5 may be further turned on. Meanwhile, during the initialization period t1, a gate signal at the turn-on level may be applied to the initialization switch SPRE from the data driver 30, and the initialization switch SPRE may be turned on.

When the reference voltage Vref is applied to the second node N2 through the turned-on second transistor T2, the gate electrode of the driving transistor DT may be initialized to the reference voltage Vref. Additionally, when the sensing reference voltage VpreS is applied to the fourth node N4 through the turned-on initialization switch SPRE and the third transistor T3, the fourth node N4 may be initialized to the sensing reference voltage VpreS.

When the high-potential driving voltage ELVDD is applied to the third node N3 through the turned-on fifth transistor T5, the high-potential driving voltage ELVDD may be applied to the drain electrode of the driving transistor DT. The source electrode of the driving transistor DT becomes in a voltage-variable state.

Referring to FIG. 13, during the sensing period t2, the second light-emission signal EM2 at the turn-on level may also be applied. As a result, the sixth transistor T6 may also be turned on. When the sixth transistor T6 is turned on, the driving transistor DT is turned on and may operate in a source follower manner. That is, the driving transistor DT may supply drain-source current to the first node N1 and the fourth node N4 until the gate-source voltage reaches the threshold voltage Vth of the driving transistor DT. The voltage at the fourth node N4 gradually increases from the sensing reference voltage VpreS and may converge to a voltage (Vref−Vth), corresponding to the difference between the reference voltage Vref and the threshold voltage Vth.

When the voltages at the first node N1 and the fourth node N4 saturate, the sampling switch SAM may be turned on. Then, an electrical signal corresponding to the voltage at the fourth node N4 may be transmitted through the readout line RVL to the data driver 30. The data driver 30 may convert the electrical signal (e.g., sensing current) into sensing data Vsen through the analog-to-digital converter ADC and transmit the sensing data Vsen to the timing controller 10.

Meanwhile, during operation in sensing mode, at least some of the driving current applied to the light-emitting element LD of the pixel PXn+2 positioned in the adjacent pixel row, such as the next pixel row, the (n+2)-th pixel row, may be applied to the anode electrode of the light-emitting element LD of the pixel PXn+1 positioned in the (n+1)-th pixel row through the turned-on eighth transistor T8. The light-emitting element LD of the pixel PXn+1 positioned in the (n+1)-th pixel row may emit light with a brightness corresponding to the driving current applied from the adjacent pixel row's pixel PXn+2.

In the illustrated embodiment, during the sensing of the characteristic values of the pixel PXn+1, it emits light with brightness corresponding to the adjacent pixel PXn+2 and is configured to display an image. In detail, the pixel PXn+1 may form an electrical path through the third transistor T3 controlled by the third scan signal SC3 and connected to the readout line RVL, through which the sensing current is output. Additionally, the pixel PXn+1 may separate the electrical path for outputting the sensing current and the electrical path for applying driving current to the light-emitting element LD via the seventh transistor T7, controlled by the third light-emission signal EM3. A Iso, the pixel PXn+1 may be electrically connected to the adjacent pixel PXn+2 through the eighth transistor T8, controlled by the fifth scan signal SC5, and receive the driving current. For pixels other than the sensing pixel PXn+1 (e.g., pixels PXn and PXn+2), the fifth scan signal SC5 is applied at the turn-off level, preventing the driving current from the adjacent pixel PXn+2 from affecting the luminance of other pixels PXn.

This configuration enables a real-time sensing process where sensing and image display are performed simultaneously for the pixels PXn, PXn+1, and PXn+2. As a result, the image of the sensing pixel is not interrupted, preventing issues such as blackouts or luminance defects from becoming visible during the real-time sensing process.

In this embodiment, the adjacent pixel PXn+2 of the sensing pixel PXn+1 may be controlled to apply a driving current with a value higher than the required driving current. For example, a data voltage Vdata higher than the required data voltage Vdata may be applied to the adjacent pixel PXn+2 to increase the driving current. Therefore, even if some of the driving current from the adjacent pixel PXn+2 is applied to the sensing pixel PXn+1, the luminance degradation in the adjacent pixel PXn+2 may be prevented.

Figure 14:
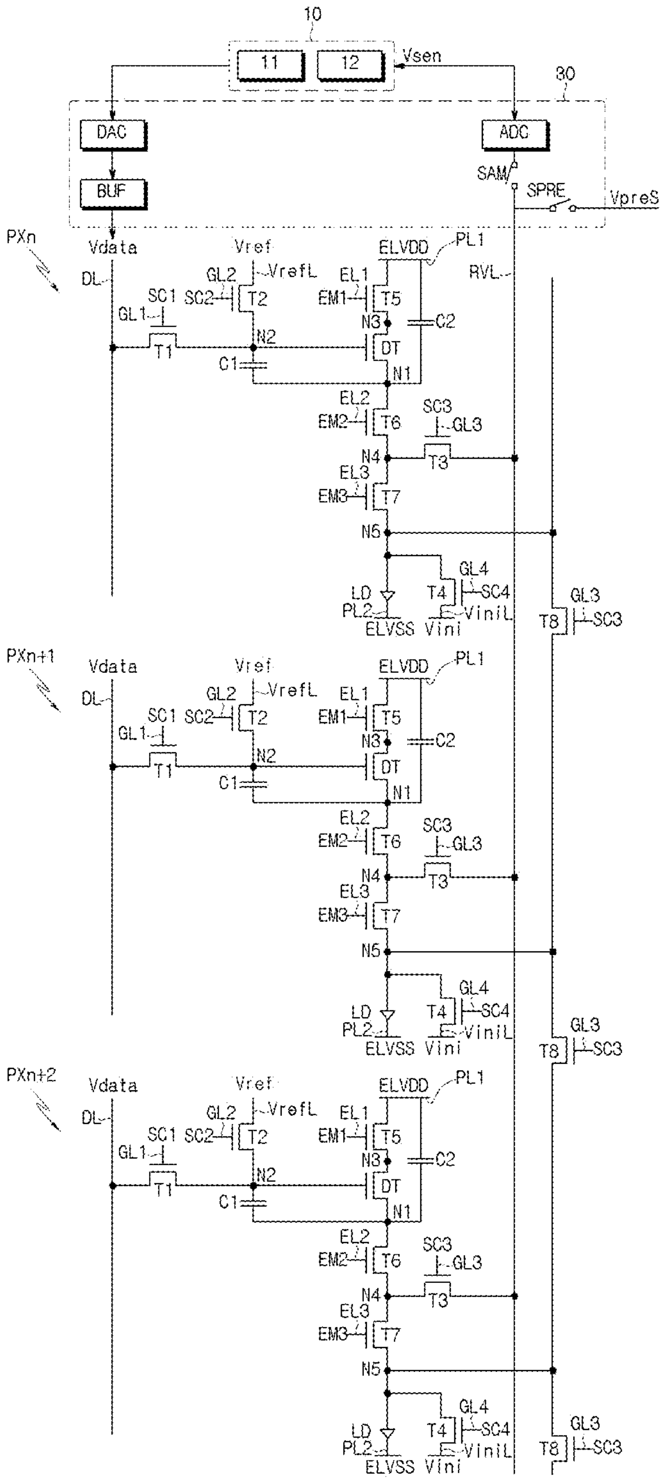
FIG. 14 is a diagram illustrating the connection relationship between a pixel, a data driver, and a timing controller according to a second embodiment.

FIG. 14 is a diagram illustrating the connection relationship between a pixel, a data driver, and a timing controller according to a second embodiment. In FIG. 14, for convenience of explanation, three pixels PXn, PXn+1, and PXn+2 arranged in the nth (n is a natural number) to the (n+2)th pixel rows are illustrated.

In the embodiment of FIG. 14, the gate electrode of the eighth transistor T8 of the pixels PXn, PXn+1, and PXn+2 is connected to the third scan line GL3, rather than the fifth scan line GL5. The eighth transistor T8 is turned on and off in response to the third scan signal SC3 applied to the third scan line GL3.

Compared to the embodiment of FIG. 3, the embodiment of FIG. 14 reduces the number of required scan signals and scan lines GL, which simplifies the structure of the gate driver 20 and the display panel 50, reduces size and thickness, and lowers manufacturing processes and costs.

Figure 15:
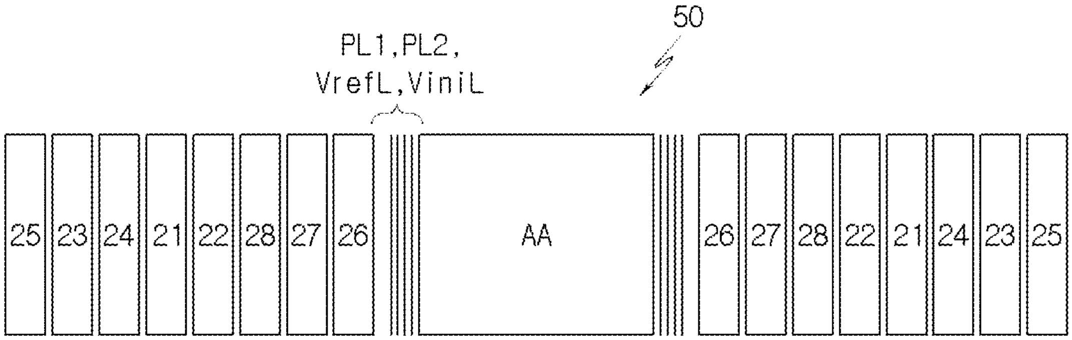
FIG. 15 is a block diagram illustrating the configuration of a gate driver according to the first embodiment.

FIG. 15 is a block diagram illustrating the configuration of a gate driver according to the first embodiment.

Referring to FIG. 15, the display panel 50 may include a display area AA where an image is displayed, and a non-display area around the display area AA where no image is displayed.

The display area AA may include an array of pixels PX (FIG. 1). At least part of the driving unit may be mounted or connected in the non-display area. For example, the gate driver 20 may be positioned in the non-display area on one side of the display area AA or, as illustrated, on both sides (e.g., left and right sides) of the display area AA. The gate driver 20 arranged on both sides of the display area AA may be configured symmetrically (in a mirrored form). Hereinafter, the configuration will be described based on the gate driver 20 arranged on the left side of the display area AA.

The gate driver 20 may be configured with first to eighth shift registers 21 to 28.

The first to fifth shift registers 21 to 25 constitute the scan driving circuit 20A (FIG. 1) and may be configured to output scan signals SC1, SC2, SC3, SC4, and SC5 (FIG. 3). For example, the first shift register 21 may sequentially output the first scan signal SC1 through the first scan lines GL1, the second shift register 22 may sequentially output the second scan signal SC2 through the second scan lines GL2, the third shift register 23 may sequentially output the third scan signal SC3 through the third scan lines GL3, the fourth shift register 24 may sequentially output the fourth scan signal SC4 through the fourth scan lines GL4, and the fifth shift register 25 may sequentially output the fifth scan signal SC5 through the fifth scan lines GL5.

The first to fifth shift registers 21 to 25 may each be composed of stage circuits that are connected in cascade. Each stage circuit may be connected to corresponding scan lines GL1, GL2, GL3, GL4, and GL5 and may output scan signals SC1, SC2, SC3, SC4, and SC5 to the scan lines GL1, GL2, GL3, GL4, and GL5.

The first to fifth scan signals SC1, SC2, SC3, SC4, and SC5 may be used to drive at least one transistor included in the pixel PX. For example, the first to fifth scan signals SC1, SC2, SC3, SC4, and SC5 may be used to program image data DATA (FIG. 1) into the pixel PX, initialize the voltage stored in the pixel PX, or compensate for characteristics of circuit elements.

The sixth to eighth shift registers 26 to 28 form the emission driving circuit 20B (FIG. 1) and may be configured to output light-emission signals EM1, EM2, and EM3 (FIG. 3). For example, the sixth shift register 26 may output the first light-emission signal EM1 through the first emission lines EL1, the seventh shift register 27 may output the second light-emission signal EM2 through the second emission lines EL2, and the eighth shift register 28 may output the third light-emission signal EM3 through the third emission lines EL3.

The first to third light-emission signals EM1 to EM3 may be used to drive at least one transistor included in the pixel PX. For example, the first to third light-emission signals EM1 to EM3 may be used to control the light emission of the pixel PX or to separate the electrical path for displaying an image from the electrical path for sensing characteristic values of the pixel PX.

In the illustrated embodiment, the third shift register 23 and the fifth shift register 25 are disposed farthest from the display area AA, while the remaining shift registers 21, 22, 24, 26, 27, and 28 may be disposed adjacent to the display area AA.

The first, second, and fourth shift registers 21, 22, and 24 may be arranged in a predetermined order. For example, the second shift register 22, the first shift register 21, and the fourth shift register 24 may be sequentially arranged farther from the display area AA, but this is not limited thereto.

The sixth to eighth shift registers 26, 27, and 28 may be arranged in a predetermined order. For example, the sixth shift register 26, the seventh shift register 27, and the eighth shift register 28 may be sequentially arranged farther from the display area AA, but this is not limited thereto.

In another embodiment, not illustrated, the eighth shift register 28 may be arranged farthest from the display area AA, but the embodiment is not limited thereto.

The arrangement of the shift registers 21 to 28 is not limited to the illustrated configuration. The arrangement of the shift registers 21 to 28 may vary within the possible range depending on the specifications of the display panel 50 to reduce the size of the non-display area and minimize the length and amount of wiring.

In one embodiment, the shift registers 21 to 28 may be configured to receive any one of the scan signals SC1 to SC5 and/or the light-emission signals EM1 to EM3 output from other shift registers 21 to 28. For example, the scan signals SC3 and SC5 output from the third shift register 23 or the fifth shift register 25 may be provided as input signals to at least one of the other shift registers 21, 22, 24, 26, 27, and 28.

In this embodiment, the scan signals SC3 and SC5 output from the third shift register 23 or the fifth shift register 25 may be used to control the output of the scan signals SC1, SC2, and SC4 and/or the light-emission signals EM1, EM2, and EM3 from the other shift registers 21, 22, 24, 26, 27, and 28. For example, in response to the scan signals SC3 and SC5 output from the third shift register 23 or the fifth shift register 25, the sequential output of the scan signals SC1, SC2, and SC4 and/or the light-emission signals EM1, EM2, and EM3 to predetermined scan lines GL1, GL2, and GL4 and/or emission lines EL1, EL2, and EL3 may be skipped, or the output levels of the scan signals SC1, SC2, and SC4 and/or the light-emission signals EM1, EM2, and EM3 may be controlled to a turn-on level or a turn-off level.

In one embodiment, various power wiring may be arranged between the display area AA and the gate driver 20. For example, a reference voltage line VrefL, an initialization voltage line ViniL, a high-potential driving voltage line PL1, and a low-potential driving voltage line PL2 may be arranged between the display area AA and the gate driver 20.

Meanwhile, in FIG. 15, the areas of the shift registers 21 to 28 are shown to be the same, but the embodiment is not limited to that configuration.

Figure 16:
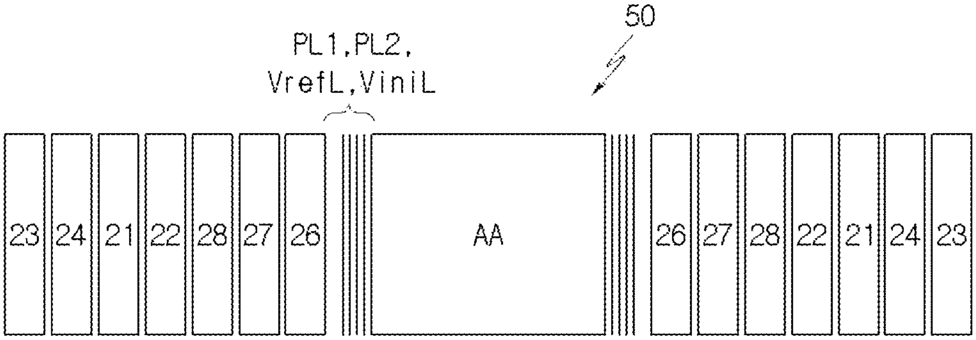
FIG. 16 is a block diagram illustrating the configuration of a gate driver according to the second embodiment.

FIG. 16 is a block diagram illustrating the configuration of a gate driver according to the second embodiment.

Referring to FIG. 16, compared to the embodiment of FIG. 15, the fifth shift register 25 is omitted. When the third scan signal SC3 and the fifth scan signal SC5 have the same waveform, the third scan signal SC3 output from the third shift register 23 may perform the function of the fifth scan signal SC5.

In this embodiment, the number of shift registers is reduced, which may reduce the size of the gate driver 20, making it easier to implement a narrow bezel.

Figure 17:
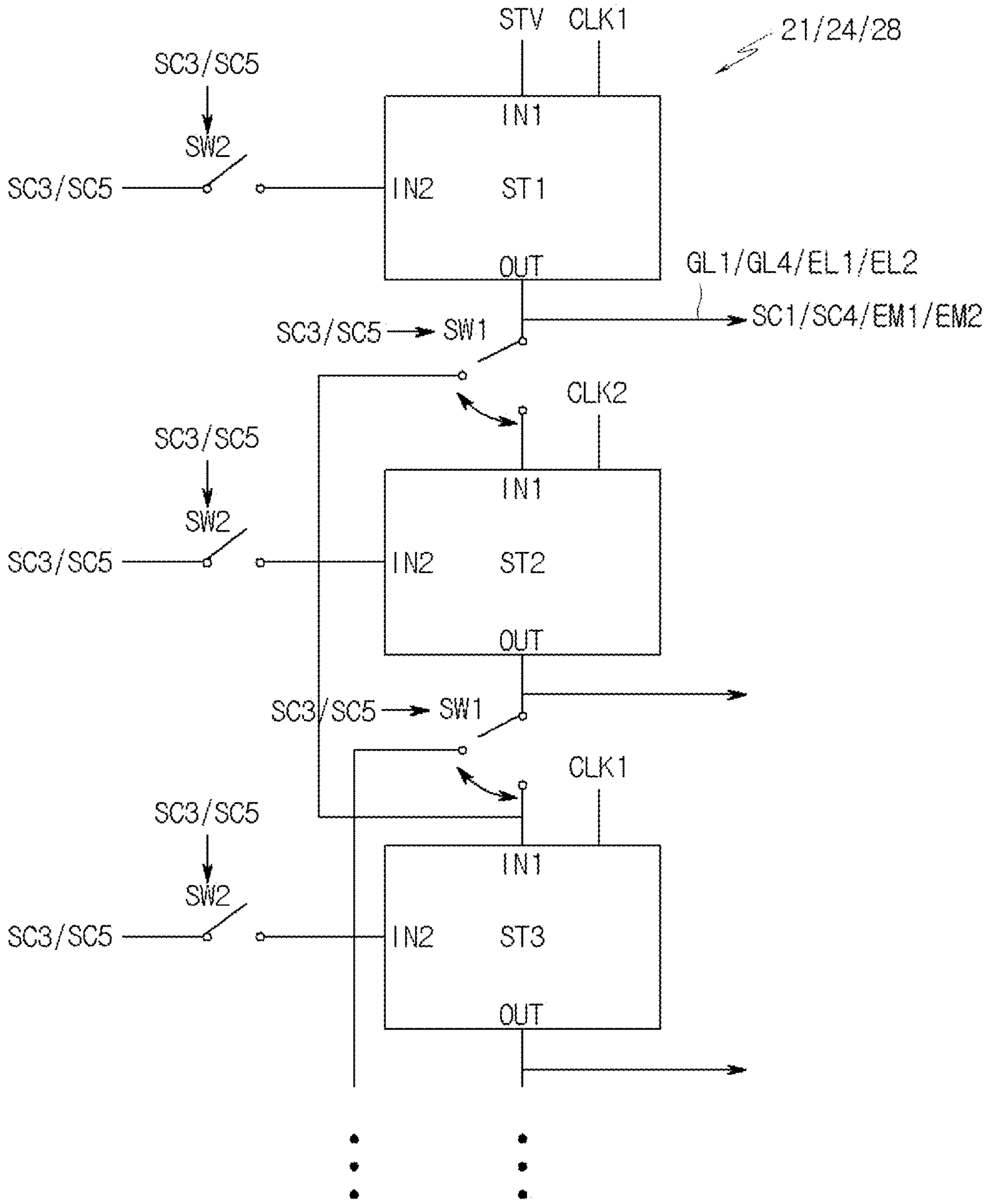
FIG. 17 is a diagram illustrating the connection relationship of stage circuits in the gate driver according to the first embodiment.

FIG. 17 is a diagram illustrating the connection relationship of stage circuits in the gate driver according to the first embodiment. Specifically, FIG. 17 illustrates the stage circuits of one of the first, fourth, and eighth shift registers 21, 24, and 28 shown in FIG. 16.

The first, fourth, and eighth shift registers 21, 24, and 28 may output a scan signal SC1 and SC4 or light-emission signals EM1, EM2 at a turn-on level for a predetermined period to the corresponding gate lines GL1 and GL4 or emission lines EL1, EL2 when a predetermined pixel row is driven in the display mode. Additionally, the first, fourth, and eighth shift registers 21, 24, and 28 may output a scan signal SC1 and SC4 or light-emission signals EM1, EM2, at a turn-off level for one frame to the corresponding gate lines GL1 and GL4, or emission lines EL1, EL2, when a predetermined pixel row is driven in the sensing mode.

In this embodiment, the shift registers 21, 24, 28 may include a plurality of stage circuits ST1, ST2, and ST3. In FIG. 17, three stage circuits ST1, ST2, and ST3 are shown as examples.

The stage circuits ST1, ST2, and ST3 may be connected in cascade. For example, the second stage circuit ST2 may be connected in cascade to the first stage circuit ST1, the third stage circuit ST3 may be connected in cascade to the second stage circuit ST2, and the fourth stage circuit may be connected in cascade to the third stage circuit ST3.

The stage circuits ST1, ST2, and ST3 may have substantially the same configuration.

The stage circuits ST1, ST2, and ST3 are configured to receive a start signal STV and clock signals CLK1 and CLK2 from the timing controller 10 (FIG. 1). In the illustrated embodiment, two gate clock signals CLK1 and CLK2 are applied to the stage circuits ST1, ST2, and ST3, but this embodiment is not limited thereto, and a greater or smaller number of clock signals may be provided to the stage circuits ST1, ST2, and ST3.

The clock signals CLK1 and CLK2 may have the same waveform and may be clock signals with a phase shift at a predetermined interval. For example, the first clock signal CLK1 may have no phase shift, while the second clock signal CLK2 may be phase-shifted by ½ of a cycle relative to the first clock signal CLK1. The stage circuits ST1, ST2, and ST3 may be configured to receive one of the corresponding clock signals CLK1 or CLK2.

The first stage circuit ST1 may be configured to receive the start signal STV through the first input terminal IN1. The subsequent stage circuit ST2 (ST3) may receive signals from the preceding stage circuit ST1 (ST2) through the first input terminal IN1. For example, the subsequent stage circuit ST2 (ST3) may receive signals output from the preceding stage circuit ST1 (ST2) through their output terminal OUT.

Each of the stage circuits ST1, ST2, and ST3 may generate scan signals SC1 and SC4 or light-emission signals EM1, EM2 based on the start signal STV or the output signal of the preceding stage circuits ST1 or ST2, as well as the clock signals CLK1 and CLK2. Each of the stage circuits ST1, ST2, and ST3 may output scan signal SC1 (SC4) or light-emission signals EM1, EM2 to the corresponding gate lines GL1 and GL4 or emission lines EL1, EL2 through their output terminals OUT.

Each of the stage circuits ST1, ST2, and ST3 may be configured to pull up based on the start signal STV or the output signal of the preceding stage circuits ST1 or ST2, and, in response to the clock signals CLK1 (CLK2), output scan signals SC1 (SC4) or light-emission signals EM1, EM2 at a turn-on level through their output terminals OUT. However, this embodiment is not limited thereto.

In one embodiment, the shift registers 21, 24, and 28 may further include a first switching unit SW1 and a second switching unit SW2 provided between the stage circuits ST1, ST2, and ST3. The first switching unit SW1 and the second switching unit SW2 may be configured to be turned on/off by either the third scan signal SC3 or the fifth scan signal SC5. In more detail, the first switching unit SW1 and the second switching unit SW2, which are connected to the input terminals IN1 and/or IN2 of the i-th stage circuit of the shift registers 21, 24, and 28 (where i is a natural number greater than or equal to 1), may be configured to receive the third scan signal SC3 or fifth scan SC5 output from the i-th stage circuit of the third or fifth shift registers 23 or 25.

The first switching unit SW1 may electrically connect the output terminal OUT of the previous stage circuit ST1 (ST2) to either the next stage circuit ST2 or the subsequent stage circuit ST3. Specifically, the first switching unit SW1 may be configured to connect the output terminal OUT of the i-th stage circuit to the first input terminal IN1 of either the (i+1)-th stage circuit or the (i+2)-th stage circuit. In the illustrated embodiment, the first switching unit SW1 is configured to respond to either the third scan signal SC3 or the fifth scan signal SC5 and connect the output terminal OUT of the first stage circuit ST1 to the first input terminal IN1 of either the second stage circuit ST2 or the third stage circuit ST3.

For example, when the third scan signal SC3 or the fifth scan signal SC5 is at a turn-off level, the first switching unit SW1 may connect the first stage circuit ST1 to the second stage circuit ST2. In this case, the signal output from the first stage circuit ST1 is applied to the second stage circuit ST2, causing the second stage circuit ST2 to be in a pull-up state. The pulled-up second stage circuit ST2 may then output the scan signal SC1 (SC4) or light-emission signals EM1, EM2 at a turn-on level in response to the clock signals CLK1 (CLK2). Thus, when the stage circuits ST1, ST2, and ST3 are electrically connected through the first switching unit SW1, the scan signal SC1 (SC4) or light-emission signal EM1, EM2 may be sequentially output to the pixel rows.

On the other hand, when the third scan signal SC3 or the fifth scan signal SC5 is at a turn-on level, the first switching unit SW1 may connect the first stage circuit ST1 to the third stage circuit ST3. As a result, the signal output from the first stage circuit ST1 may not be applied to the second stage circuit ST2, but instead may be applied to the third stage circuit ST3, which may be in a pull-up state. The pulled-up third stage circuit ST3 may then output the scan signal SC1 (SC4) or light-emission signals EM1, EM2 at a turn-on level in response to the clock signal CLK1 (CLK2). The second stage circuit ST2 may maintain its previous state, such as a pull-down state. In this way, connections between the stage circuits ST1, ST2, and ST3 may be skipped through the first switching unit SW1.

The second switching unit SW2 is configured to respond to either the third scan signal SC3 or the fifth scan signal SC5, and to apply the third scan signal SC3 or the fifth scan signal SC5 to the corresponding stage circuit ST1, ST2, or ST3. That is, the second switching unit SW2 is configured to control the electrical connection between the output terminal of the third scan signal SC3 or fifth scan signal SC5 and the second input terminal IN2 of the corresponding stage circuit ST1, ST2, or ST3 in response to the third scan signal SC3 or fifth scan signal SC5.

For example, when the third scan signal SC3 or the fifth scan signal SC5 is at a turn-off level, the second switching unit SW2 may disconnect the connection between the corresponding stage circuit ST1, ST2, or ST3 and the third scan signal SC3 or fifth scan signal SC5.

On the other hand, when the third scan signal SC3 or the fifth scan signal SC5 is at a turn-on level, the second switching unit SW2 may connect the corresponding stage circuit ST1, ST2, or ST3 with the third scan signal SC3 or fifth scan SC5. As a result, the corresponding stage circuit ST1, ST2, or ST3 may generate scan signal SC1 (SC4) or light-emission signals EM1, EM2 based on the third scan signal SC3 or the fifth scan signal SC5 applied to the second input terminal IN2. For example, the corresponding stage circuit ST1, ST2, or ST3 may generate scan signals SC1 (SC4) or light-emission signals EM1, EM2 by inverting the third scan signal SC3 or the fifth scan signal SC5. In this embodiment, the corresponding stage circuit ST1, ST2, or ST3 may output a turn-off level scan signal SC1 (SC4) or light-emission signals EM1, EM2 at the output terminal OUT.

In this way, when the third scan signal SC3 or fifth scan signal SC5 at a turn-on level is applied to a pixel row driven in the sensing mode, the first and fourth scan signals SC1 and SC4 and the light-emission signals EM1, EM2 at a turn-off level are applied to the corresponding pixel row, while the first and fourth scan signals SC1 and SC4 and light-emission signals EM1, EM2 at turn-on level may be sequentially applied to a pixel row driven in the display mode.

In one embodiment, the second switching unit SW2 may be omitted. In this embodiment, the stage circuits ST1, ST2, and ST3, for which the pull-up is skipped, may maintain their previous state, the pull-down state, thereby maintaining the first and fourth scan signals SC1 and SC4 and the light-emission signal EM1, EM2 at a turn-off level for one frame. However, by directly supplying input signals to the stage circuits ST1, ST2, and ST3, for which the pull-up is skipped, through the second switching unit SW2, the first and fourth scan signals SC1 and SC4 and light-emission signals EM1, EM2 may maintain a stable voltage level.

Figure 18:
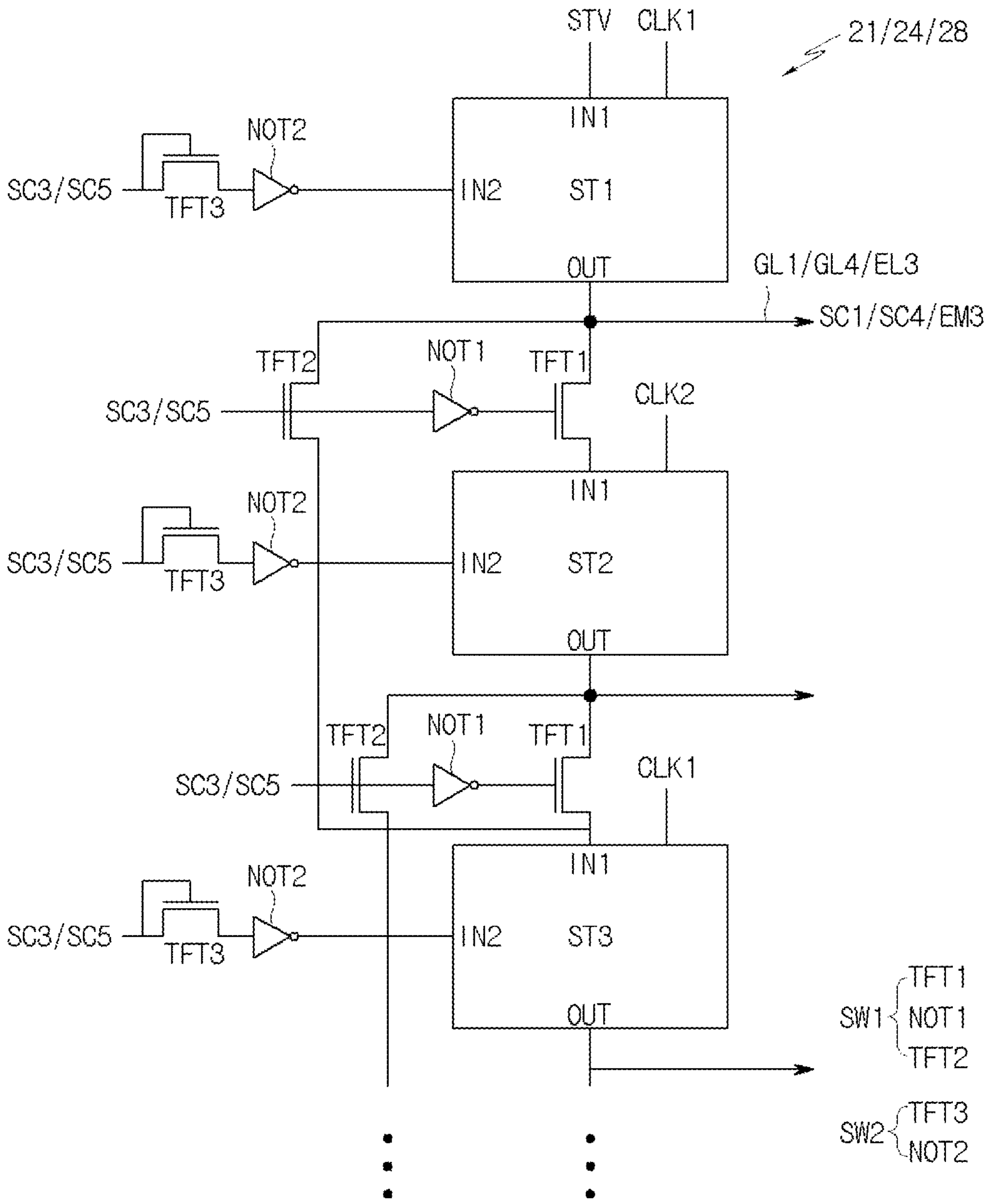
FIG. 18 is a diagram illustrating operational details of the stage circuits of the gate driver shown in FIG. 17 according to an embodiment.

FIG. 18 is a diagram illustrating operational details of the stage circuits of the gate driver shown in FIG. 17 according to an embodiment.

Referring to FIG. 18, in one embodiment, the first switching unit SW1 may include a first switching element TFT1, a first inversion element NOT1 connected to the first switching element TFT1, and a second switching element TFT2.

The first switching element TFT1 is a first-type transistor, which may be, for example, an N-type transistor as illustrated. In this embodiment, the first switching element TFT1 is connected between the output terminal OUT of the previous stage circuit ST1 (ST2) and the first input terminal IN1 of the next stage circuit ST2 (ST3). The gate electrode of the first switching element TFT1 is connected to the first inversion element NOT1. The gate electrode of the first switching element TFT1 is configured to receive an inverted signal of the third scan signal SC3 or fifth scan signal SC5 through the first inversion element NOT1. When the third scan signal SC3 or fifth scan signal SC5 is at a low level, the first switching element TFT1 receives a high-level signal through the first inversion element NOT1 and is turned on. When turned on, the first switching element TFT1 electrically connects the previous stage circuit ST1 (ST2) to the next stage circuit ST2 (ST3).

The first inversion element NOT1 inverts the voltage level of the third scan signal SC3 or fifth scan signal SC5 and applies it to the gate electrode of the first switching element TFT1.

The second switching element TFT2 is a first-type transistor, which may also be, for example, an N-type transistor as illustrated. In this embodiment, the second switching element TFT2 is connected between the output terminal OUT of the previous stage circuit ST1 and the first input terminal IN1 of the second next stage circuit ST3. The gate electrode of the second switching element TFT2 is configured to receive the third scan signal SC3 or fifth scan SC5. The second switching element TFT2 may electrically connect the previous stage circuit ST1 to second next stage circuit ST3 in response to the third scan signal SC3 or fifth scan signal SC5 at a high-level.

In this embodiment, when the third scan signal SC3 or fifth scan signal SC5 is at a low level, the first switching element TFT1 is turned on, and the corresponding stage circuit ST1 (ST2) is electrically connected to the adjacent next stage circuit ST2 (ST3). As a result, the adjacent stage circuits ST1, ST2, and ST3 may be sequentially pulled-up and may output the high-level scan signal SC1 (SC4) or light-emission signal EM3.

When the third scan signal SC3 or fifth scan signal SC5 is at a high level, the second switching element TFT2 is turned on, and the corresponding stage circuit ST1 is electrically connected to the subsequent stage circuit ST3. As a result, the sequential output of the scan signal SC1 (SC4) or light-emission signal EM3 from the corresponding stage circuit ST2 may be skipped.

The second switching unit SW2 may include the third switching element TFT3 and the second inversion element NOT2 connected to the third switching element TFT3.

The third switching element TFT3 is a first-type transistor, which may be, for example, an N-type transistor as illustrated. In this embodiment, one end of the third switching element TFT3 is configured to receive the third scan signal SC3 or fifth scan signal SC5, and the other end is connected to the second inversion element NOT2. The gate electrode of the third switching element TFT3 is configured to receive the third scan signal SC3 or fifth scan signal SC5. The third switching element TFT3 may output the third scan signal SC3 or fifth scan signal SC5 in response to the third scan signal SC3 or fifth scan signal SC5 at the high-level.

The second inversion element NOT2 may invert the voltage level of the third scan signal SC3 or fifth scan signal SC5 output from the third switching element TFT3 and output it to the corresponding stage circuit ST1 (ST2, or ST3).

The stage circuit ST1 (ST2, or ST3) may generate and output the scan signals SC1 (SC4) or light-emission signal EM3 based on the third scan signal SC3 or fifth scan signal SC5 input through the second inversion element NOT2. For example, when the third scan signal SC3 or fifth scan signal SC5 is at a low level, the stage circuit ST1 (ST2, or ST3) may output the high-level scan signal SC1 (SC4) or light-emission signal EM3, and when the third scan signal SC3 or fifth scan signal SC5 is at a high level, the stage circuit ST1 (ST2, or ST3) may output the low-level scan signal SC1 (SC4) or light-emission signal EM3.

The stage circuit ST1 (ST2, or ST3) corresponding to the sensing pixel row responds to the high-level third or fifth scan signal SC3 (SC5), and the electrical connection with the previous stage circuit and the next stage circuit is separated through the first switching unit SW1. As a result, the sequential output of the scan signal SC1 (SC4) or light-emission signals EM3 for the sensing pixel row is skipped. Instead, the stage circuit ST1 (ST2, or ST3) corresponding to the sensing pixel row, in response to the high-level third scan signal SC3 or fifth scan signal SC5, outputs the low-level scan signal SC1 (SC4) or light-emission signals EM3 for one frame.

Figure 19:
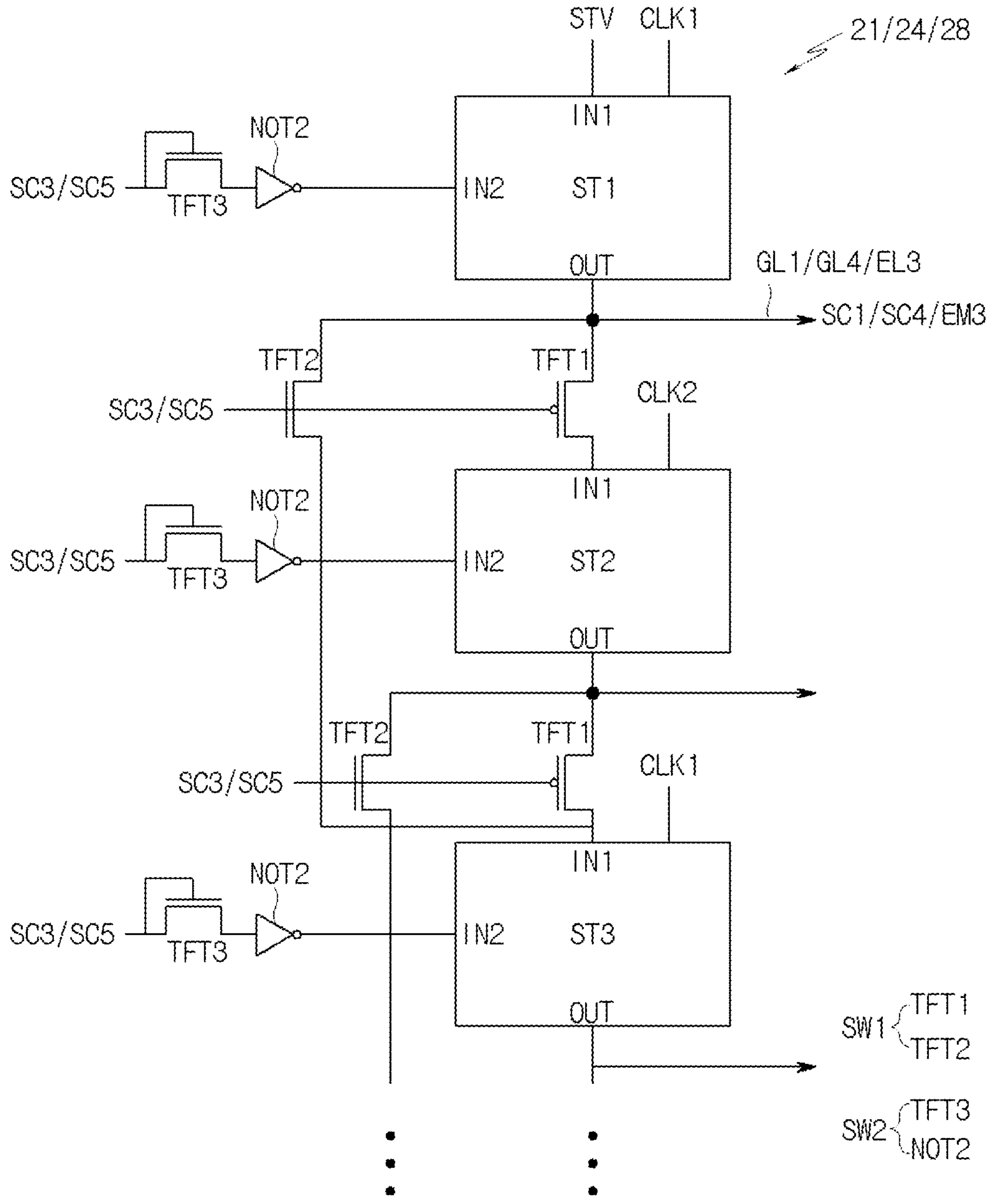
FIG. 19 is a diagram illustrating operational details of the stage circuits of the gate driver shown in FIG. 17 according to another embodiment.

FIG. 19 is a diagram illustrating operational details of the stage circuits of the gate driver shown in FIG. 17 according to another embodiment.

Referring to FIG. 19, in one embodiment, the first switching unit SW1 may include the first switching element TFT1 and the second switching element TFT2.

The first switching element TFT1 is a second-type transistor, which may, for example, be a P-type transistor as illustrated. In this embodiment, the first switching element TFT1 is connected between the output terminal OUT of the previous stage circuit ST1 (ST2) and the first input terminal IN1 of the next stage circuit ST2 (ST3). The gate electrode of the first switching element TFT1 is configured to receive the third scan signal SC3 or fifth scan signal SC5. The first switching element TFT1 may electrically connect the previous stage circuit ST1 (ST2) to the next stage circuit ST2 (ST3) in response to the low-level third scan signal SC3 or fifth scan signal SC5.

The second switching element TFT2 is a first-type transistor, which may also be, for example, an N-type transistor as illustrated. In this embodiment, the second switching element TFT2 is connected between the output terminal OUT of the previous stage circuit ST1 and the first input terminal IN1 of the second next stage circuit ST3. The gate electrode of the second switching element TFT2 is configured to receive the third scan signal SC3 or fifth scan SC5. The second switching element TFT2 may electrically connect the corresponding stage circuit ST1 (ST2) to the subsequent stage circuit ST3 in response to the high-level third scan signal SC3 or fifth scan signal SC5. As a result, the sequential output of the scan signal SC1 (SC4) or light-emission signal EM3 for the adjacent next stage circuit ST2 may be skipped.

The configuration of the second switching unit SW2 is the same as described with reference to FIG. 18, so a detailed description is omitted.

Figure 20:
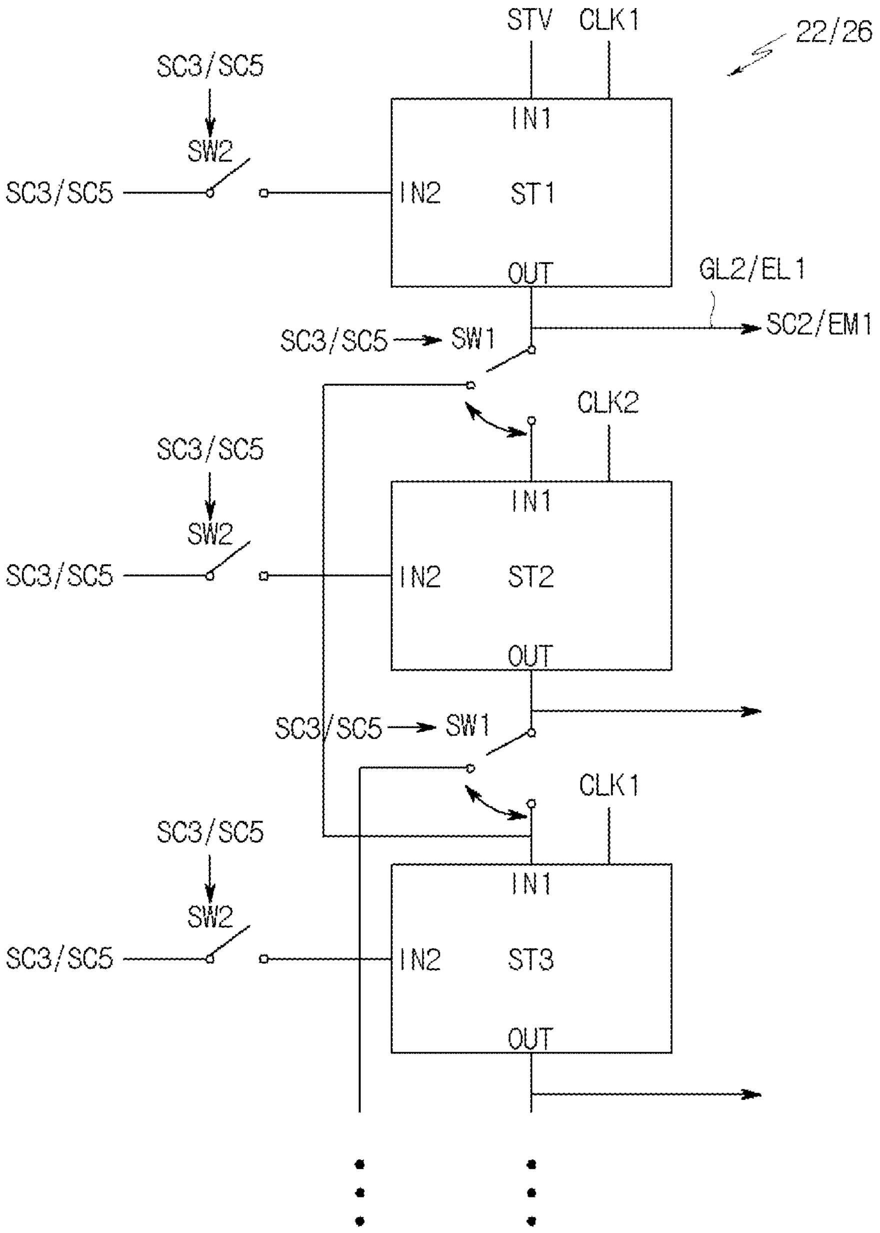
FIG. 20 is a diagram illustrating the connection relationship of stage circuits in the gate driver according to the second embodiment.

FIG. 20 is a diagram illustrating the connection relationship of stage circuits in the gate driver according to the second embodiment. Specifically, FIG. 20 shows one of the stage circuits of the second and sixth shift registers 22 and 26 depicted in FIG. 16.

The second and sixth shift registers 22 and 26 may output a scan signal SC2 or light-emission signal EM1 at a predetermined turn-on level for a predetermined period to the gate line GL2 or emission line EL1 connected to the corresponding pixel row when the pixel row is driven in display mode. Additionally, the second and sixth shift registers 22 and 26 may output a scan signal SC2 or light-emission signal EM1 at a turn-on level for one frame to the gate line GL2 or emission line EL1 when the corresponding pixel row is driven in sensing mode.

In this embodiment, the shift registers 22 and 26 may include a plurality of stage circuits ST1, ST2, and ST3. In FIG. 20, three stage circuits ST1, ST2, and ST3 are shown as examples.

The stage circuits ST1, ST2, and ST3 may be connected in cascade. For example, the second stage circuit ST2 may be connected in cascade to the first stage circuit ST1, the third stage circuit ST3 may be connected in cascade to the second stage circuit ST2, and the fourth stage circuit ST4 may be connected in cascade to the third stage circuit ST3.

The stage circuits ST1, ST2, and ST3 may have substantially the same configuration.

The stage circuits ST1, ST2, and ST3 are configured to receive a start signal STV and clock signals CLK1 and CLK2 from the timing controller 10 (FIG. 1). In the illustrated embodiment, two gate clock signals CLK1 and CLK2 are applied to the stage circuits ST1, ST2, and ST3, but this embodiment is not limited thereto, and a greater or smaller number of clock signals may be provided to the stage circuits ST1, ST2, and ST3.

The clock signals CLK1 and CLK2 may have the same waveform and may be clock signals with a phase shift at a predetermined interval. For example, the first clock signal CLK1 may have no phase shift, while the second clock signal CLK2 may be phase-shifted by ½ of a cycle relative to the first clock signal CLK1. The stage circuits ST1, ST2, and ST3 may be configured to receive one of the corresponding clock signals CLK1 or CLK2.

The first stage circuit ST1 may be configured to receive the start signal STV through the first input terminal IN1. The subsequent stage circuit ST2 (ST3) may receive signals from the preceding stage circuit ST1 (ST2) through the first input terminal IN1. For example, the subsequent stage circuit ST2 (ST3) may receive signals output from the preceding stage circuit ST1 (ST2) through their output terminal OUT.

Each of the stage circuits ST1, ST2, and ST3 may generate a scan signal SC2 or light-emission signal EM1 based on the start signal STV, the output signal of the preceding stage circuit ST1 (ST2), and the clock signal CLK1 (CLK2). Additionally, each of the stage circuit ST1, ST2, and ST3 may output the scan signal SC2 or light-emission signal EM1 to the corresponding gate line GL2 or emission line EL1 through the output terminal OUT.

Each of the stage circuit ST1, ST2, and ST3 may be configured to be pulled up in response to the start signal STV or an output signal of the preceding stage circuit ST1 (ST2), and, in response to the clock signal CLK1 (CLK2), output a scan signal SC2 or alight-emission signal EM1 at a turn-on level to an output terminal OUT. However, this embodiment is not limited thereto.

In one embodiment, the shift registers 22 and 26 may further include a first switching unit SW1 and a second switching unit SW2, which are provided between the stage circuits ST1, ST2, and ST3. The first switching unit SW1 and the second switching unit SW2 may be configured to be turned on/off by either the third scan signal SC3 or the fifth scan signal SC5. M ore specifically, the first switching unit SW1 and the second switching unit SW2, connected to the output terminal OUT of the i-th stage circuit of the shift registers 22 and 26 (where i is a natural number greater than or equal to 1), may be configured to receive the third scan signal SC3 or fifth scan signal SC5 output from the i-th stage circuit of the third shift register 23 or fifth shift register 25.

The first switching unit SW1 is configured to connect the output terminal OUT of the i-th stage circuit to the first input terminal IN1 of either the (i+1)-th or (i+2)-th stage circuit. In the illustrated embodiment, the first switching unit SW1 is configured to respond to either the third scan signal SC3 or the fifth scan signal SC5 and connect the output terminal OUT of the first stage circuit ST1 to the first input terminal IN1 of either the second stage circuit ST2 or the third stage circuit ST3.

For example, when the third scan signal SC3 or the fifth scan signal SC5 is at a turn-off level, the first switching unit SW1 may connect the first stage circuit ST1 to the second stage circuit ST2. In this case, the signal output from the first stage circuit ST1 is applied to the second stage circuit ST2, causing the second stage circuit ST2 to be in a pull-up state. The pulled-up second stage circuit ST2 may then output the scan signal SC2 or light-emission signal EM1 at a turn-on level in response to the clock signals CLK1 (CLK2). Thus, when the stage circuits ST1, ST2, and ST3 are electrically connected through the first switching unit SW1, the scan signal SC2 or light-emission signal EM1 may be sequentially output to the pixel rows.

On the other hand, when the third scan signal SC3 or the fifth scan signal SC5 is at a turn-on level, the first switching unit SW1 may connect the first stage circuit ST1 to the third stage circuit ST3. As a result, the signal output from the first stage circuit ST1 may not be applied to the second stage circuit ST2, but instead may be applied to the third stage circuit ST3, which may be in a pull-up state. The pulled-up third stage circuit ST3 may then output the scan signal SC2 or light-emission signal EM1 at a turn-on level in response to the clock signals CLK1 (CLK2). The second stage circuit ST2 may maintain its previous state, such as a pull-down state. In this way, connections between the stage circuits ST1, ST2, and ST3 may be skipped through the first switching unit SW1.

The second switching unit SW2 is configured to control the electrical connection between the output terminal of the third scan signal SC3 or fifth scan signal SC5 and the second input terminal IN2 of the corresponding stage circuit ST1, ST2, or ST3 in response to the third scan signal SC3 or fifth scan signal SC5.

For example, when the third scan signal SC3 or the fifth scan signal SC5 is at a turn-off level, the second switching unit SW2 may disconnect the connection between the corresponding stage circuit ST1, ST2, or ST3 and the third scan signal SC3 or fifth scan SC5.

On the other hand, when the third scan signal SC3 or the fifth scan signal SC5 is at a turn-on level, the second switching unit SW2 may connect the corresponding stage circuit ST1, ST2, or ST3 with the third scan signal SC3 or fifth scan SC5. As a result, the corresponding stage circuit ST1, ST2, or ST3 may generate scan signal SC2 or light-emission signals EM1 based on the third scan signal SC3 or the fifth scan signal SC5 applied to the second input terminal IN2. For example, the corresponding stage circuit ST1, ST2, or ST3 may generate scan signals SC2 or light-emission signals EM1 with the same level as the third scan signal SC3 or fifth scan signal SC5. In this embodiment, the corresponding stage circuit ST1, ST2, or ST3 may output a turn-off level scan signal SC2 or light-emission signal EM1 at the output terminal OUT.

In this manner, when the third scan signal SC3 or fifth scan signal SC5 at the turn-on level is applied to the pixel row driven in sensing mode, the second scan signal SC2 and the first light-emission signal EM1 at the turn-on level are applied to the corresponding pixel row, and the second scan signal SC2 and first light-emission signal EM1 at the turn-on level may be sequentially applied to the pixel row driven in display mode.

Figure 21:
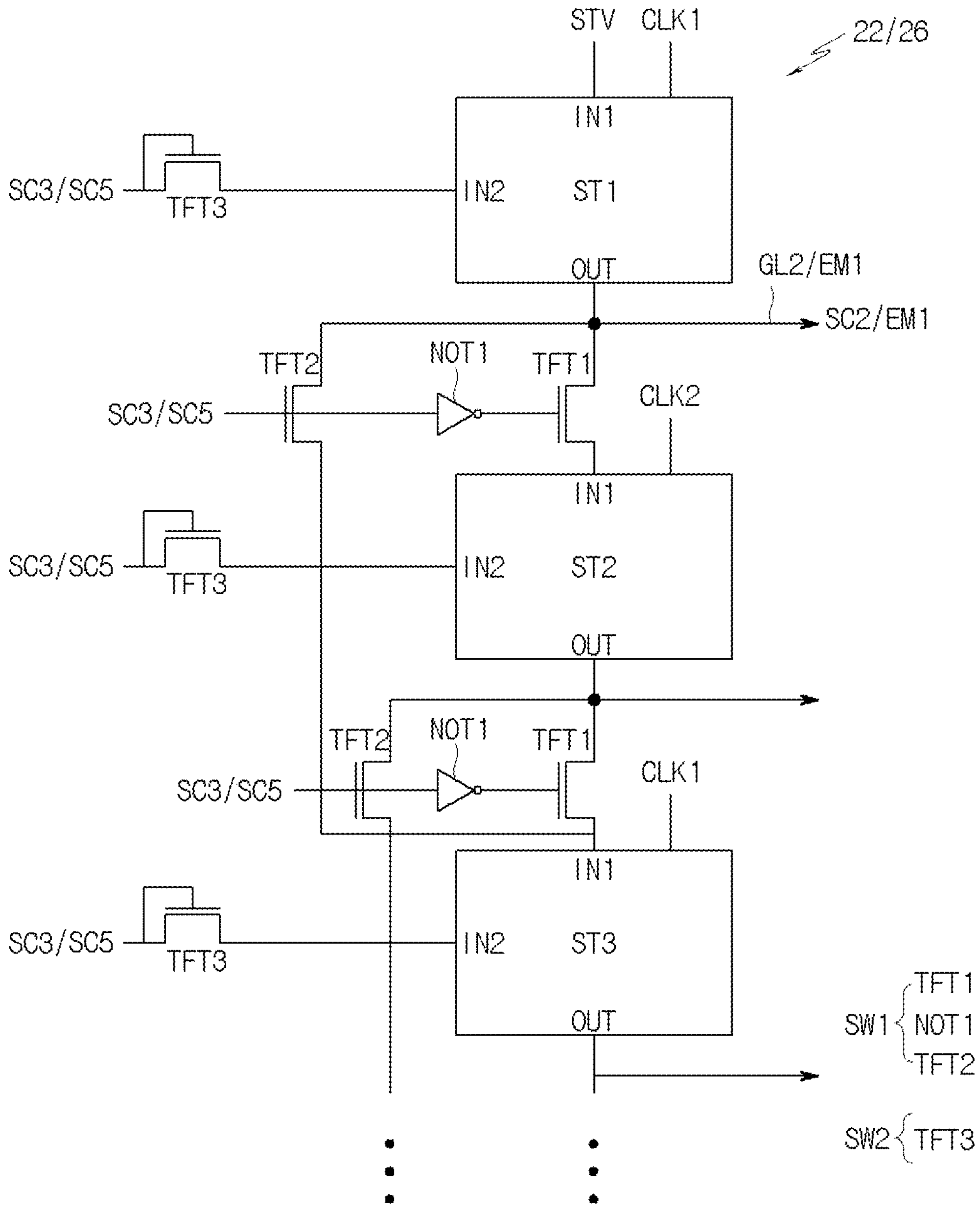
FIG. 21 is a diagram illustrating operational details of the stage circuits of the gate driver shown in FIG. 20 according to an embodiment.

FIG. 21 is a diagram illustrating operational details of the stage circuits of the gate driver shown in FIG. 20 according to an embodiment.

Referring to FIG. 21, in one embodiment, the first switching unit SW1 may include a first switching element TFT1, a second switching element TFT2, and a first inversion element NOT1 connected to the second switching element TFT2.

The first switching element TFT1 is a first-type transistor, which may be, for example, an N-type transistor as illustrated. In this embodiment, the first switching element TFT1 is connected between the output terminal OUT of the previous stage circuit ST1 (ST2) and the first input terminal IN1 of the next stage circuit ST2 (ST3). The gate electrode of the first switching element TFT1 is connected to the first inversion element NOT1. The gate electrode of the first switching element TFT1 is configured to receive an inverted signal of the third scan signal SC3 or fifth scan signal SC5 through the first inversion element NOT1. When the third scan signal SC3 or fifth scan signal SC5 is at a low level, the first switching element TFT1 receives a high-level signal through the first inversion element NOT1 and is turned on. When turned on, the first switching element TFT1 electrically connects the previous stage circuit ST1 (ST2) to the next stage circuit ST2 (ST3).

The first inversion element NOT1 inverts the voltage level of the third scan signal SC3 or fifth scan signal SC5 and applies it to the gate electrode of the first switching element TFT1.

The second switching element TFT2 is a first-type transistor, which may also be, for example, an N-type transistor as illustrated. In this embodiment, the second switching element TFT2 is connected between the output terminal OUT of the previous stage circuit ST1 and the first input terminal IN1 of the second next stage circuit ST3. The gate electrode of the second switching element TFT2 is configured to receive the third scan signal SC3 or fifth scan signal SC5. The second switching element TFT2 may electrically connect the previous stage circuit ST1 to second next stage circuit ST3 in response to the third scan signal SC3 or fifth scan signal SC5 at a high-level.

In this embodiment, when the third scan signal SC3 or fifth scan signal SC5 is at a low level, the first switching element TFT1 is turned on, and the corresponding stage circuit ST1 (ST2) is electrically connected to the adjacent next stage circuit ST2 (ST3). As a result, the adjacent stage circuits ST1, ST2, and ST3 may be sequentially pulled-up and may output the high-level scan signal SC2 or light-emission signal EM1.

When the third scan signal SC3 or fifth scan signal SC5 is at a high level, the second switching element TFT2 is turned on, and the corresponding stage circuit ST1 is electrically connected to the subsequent stage circuit ST3. As a result, the sequential output of the scan signal SC2 or light-emission signal EM1 from the corresponding stage circuit ST2 may be skipped.

The second switching unit SW2 may include the third switching element TFT3.

The third switching element TFT3 is a first-type transistor, which may be, for example, an N-type transistor as illustrated. In this embodiment, one end of the third switching element TFT3 is configured to receive the third scan signal SC3 or fifth scan signal SC5, and the other end is connected to the corresponding stage circuit, ST1 (ST2, or ST3). The gate electrode of the third switching element TFT3 is configured to receive the third scan signal SC3 or fifth scan signal SC5. The third switching element TFT3 may output the third scan signal SC3 or fifth scan signal SC5 to the corresponding stage circuits ST1 (ST2, or ST3) in response to the high-level third scan signal SC3 or fifth scan signal SC5.

The stage circuits ST1, ST2, and ST3 may generate and output the scan signal SC2 or light-emission signal EM1 based on the third scan signal SC3 or fifth scan signal SC5 input through the third switching element TFT3. For example, when the third or fifth scan signal SC3 or SC5 is at a low level, the stage circuits ST1, ST2, and ST3 may output the low-level scan signal SC2 or light-emission signal EM1, and when the third or fifth scan signal SC3 or SC5 is at a high level, the stage circuits ST1, ST2, and ST3 may output the high-level scan signal SC2 or light-emission signal EM1.

The stage circuit ST1 (ST2, or ST3) corresponding to the sensing pixel row responds to the high-level third or fifth scan signal SC3 (SC5), and the electrical connection with the previous stage circuit and the next stage circuit is separated through the first switching unit SW1. As a result, the sequential output of the scan signal SC2 or light-emission signals EM1 for the sensing pixel row is skipped. Instead, the stage circuits ST1, ST2, and ST3 corresponding to the sensing pixel row may output the high-level scan signal SC2 or light-emission signal EM1 for one frame in response to the high-level third or fifth scan signal SC3 or SC5.

Figure 22:
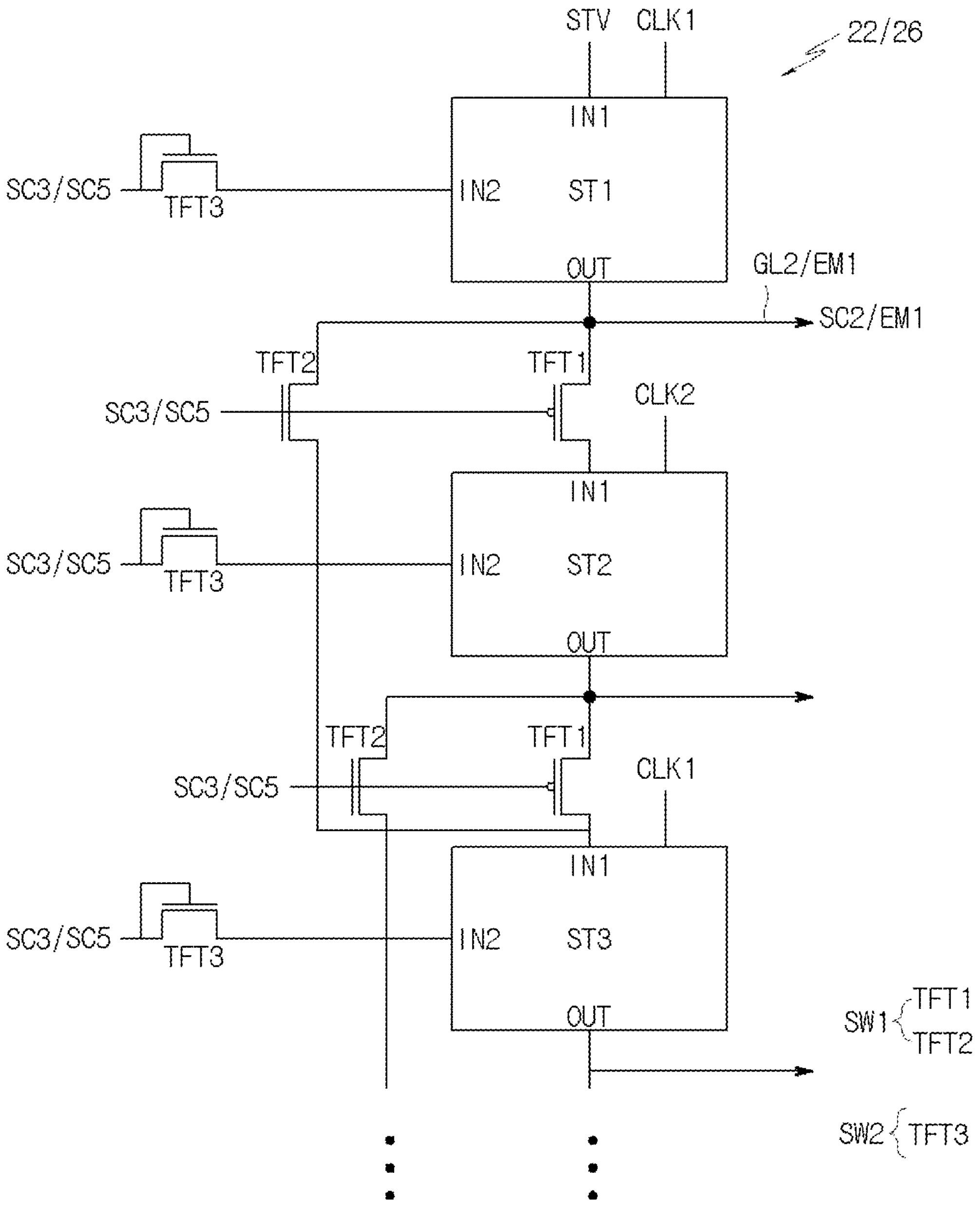
FIG. 22 is a diagram illustrating operational details of the stage circuits of the gate driver shown in FIG. 20 according to another embodiment.

FIG. 22 is a diagram illustrating operational details of the stage circuits of the gate driver shown in FIG. 20 according to another embodiment.

Referring to FIG. 22, in one embodiment, the first switching unit SW1 may include a first switching element TFT1 and a second switching element TFT2'.

The first switching element TFT1 is a second-type transistor, which may, for example, be a P-type transistor as illustrated. In this embodiment, the first switching element TFT1 is connected between the output terminal OUT of the previous stage circuit ST1 (ST2) and the first input terminal IN1 of the next stage circuit ST2 (ST3). The gate electrode of the first switching element TFT1 is configured to receive the third scan signal SC3 or fifth scan signal SC5. The first switching element TFT1 may electrically connect the previous stage circuit ST1 (ST2) to the next stage circuit ST2 (ST3) in response to the low-level third scan signal SC3 or fifth scan signal SC5.

The second switching element TFT2 is a first-type transistor, which may also be, for example, an N-type transistor as illustrated. In this embodiment, the second switching element TFT2 is connected between the output terminal OUT of the previous stage circuit ST1 and the first input terminal IN1 of the second next stage circuit ST3. The gate electrode of the second switching element TFT2 is configured to receive the third scan signal SC3 or fifth scan SC5. The second switching element TFT2 may electrically connect the corresponding stage circuit ST1 (ST2) to the subsequent stage circuit ST3 in response to the high-level third scan signal SC3 or fifth scan signal SC5. As a result, the sequential output of the scan signal SC2 or light-emission signal EM1 for the adjacent next stage circuit ST2 may be skipped.

The configuration of the second switching unit SW2 is the same as described with reference to FIG. 21, so a detailed description is omitted.

Figure 23:
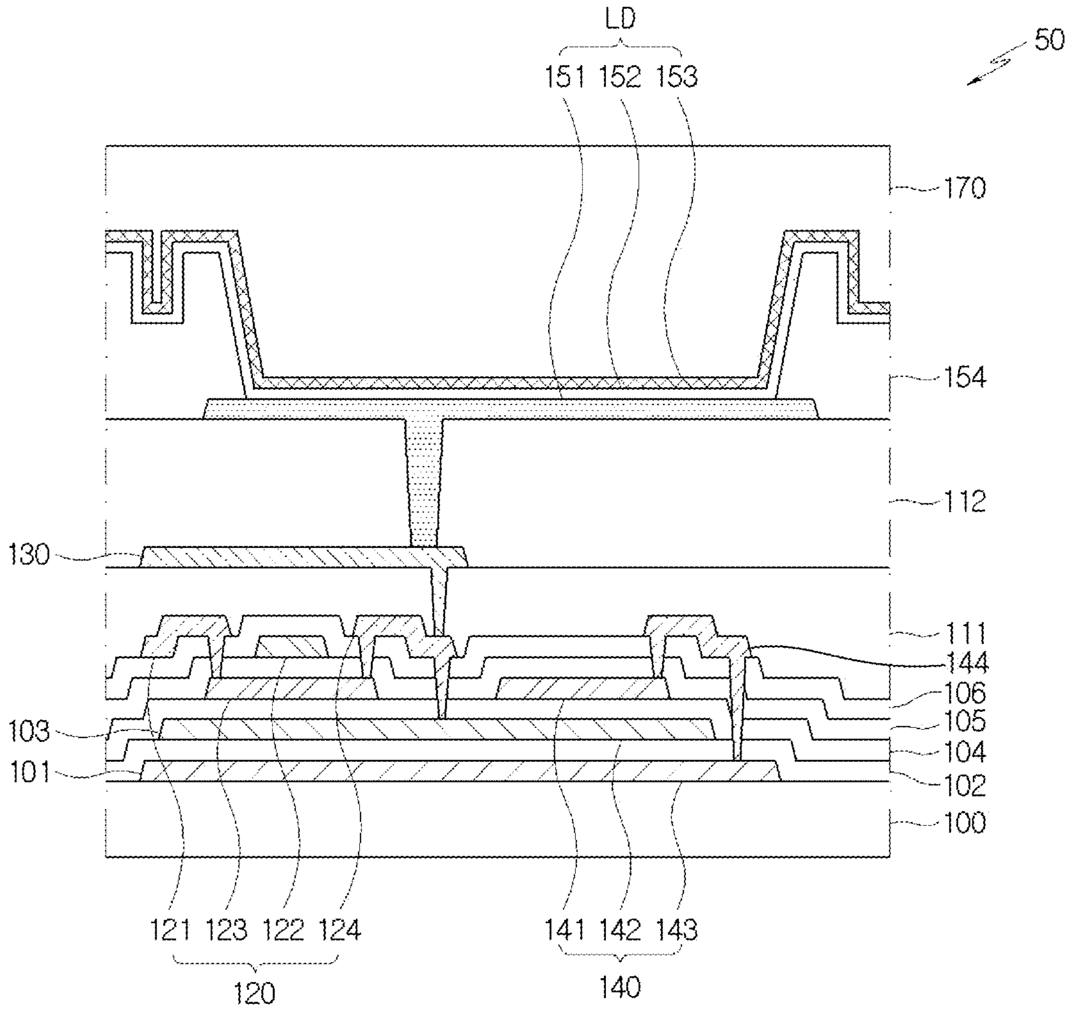
FIG. 23 is across-sectional view illustrating the stacked structure of a display device according to an embodiment.

FIG. 23 is a cross-sectional view illustrating the stacked structure of a display device according to an embodiment.

Referring to FIG. 23, the display panel 50 may include a substrate 100, a thin-film transistor 120, a light-emitting element LD, and an encapsulation layer 170. The display panel 50 may include at least one panel insulating layer between the substrate 100 and the light-emitting element LD.

The substrate 100 may include one or more plastic materials. For example, the substrate 100 may be a multi-substrate including a plurality of plastic materials, such as polyimide.

A first conductive layer may be formed on the substrate 100. The first conductive layer may include a first light-shielding layer 101. The first light-shielding layer 101 may be arranged to partially overlap with the thin-film transistor 120, protecting the thin-film transistor 120 from external light and other sources. In one embodiment, the first light-shielding layer 101 may constitute the lower electrode 143 of the capacitor 140.

The first conductive layer may be a single or multi-layer structure, including molybdenum (Mo), copper (Cu), titanium (Ti), aluminum (Al), chromium (Cr), gold (Au), nickel (Ni), neodymium (Nd), or their alloys, but is not limited thereto.

A first buffer layer 102 may be formed on the first conductive layer. The first buffer layer 102 may minimize or delay the diffusion of moisture or oxygen into the substrate 100. The first buffer layer 102 may be made by alternating at least once layers of silicon nitride (SiNx) and silicon oxide (SiOx), but is not limited thereto.

A second conductive layer may be formed on the first buffer layer 102. The second conductive layer may include a second light-shielding layer 103. The second light-shielding layer 103 may be arranged to partially overlap with the thin-film transistor 120 and the first light-shielding layer 101. The second light-shielding layer 103 may be made from the same material as the first light-shielding layer 101, but is not limited thereto. In one embodiment, the second light-shielding layer 103 may constitute the middle electrode 142 of the capacitor 140.

A second buffer layer 104 may be formed on the second conductive layer. The second buffer layer 104 may be made from the same material as the first buffer layer 102, but is not limited thereto.

The thin-film transistor 120 may be disposed on the second buffer layer 104. The thin-film transistor 120 may include a source electrode 121, a gate electrode 122, a semiconductor layer 123, and a drain electrode 124.

The semiconductor layer 123 may be disposed on the second buffer layer 104. The semiconductor layer 123 may include a metal oxide semiconductor such as IGZO (Indium-Gallium-Zinc Oxide), an amorphous silicon (a-Si), or a silicon-based semiconductor material such as polycrystalline silicon, but is not limited thereto. The semiconductor layer 123 may include a channel region, a source region, and a drain region.

A region of the semiconductor layer 123 may constitute the upper electrode 141 of the capacitor 140. The upper electrode 141, middle electrode 142, and lower electrode 143 may be arranged to partially overlap with each other, and an electric field may be formed between them. The upper electrode 141 and lower electrode 143 of the capacitor 140 may be electrically connected to each other through a bridge electrode 144, which is formed in the same layer as the source electrode 121 and drain electrode 124, as described later.

A gate insulating layer 105 may be formed on the semiconductor layer 123. The gate insulating layer 105 may be made of inorganic insulating materials such as silicon nitride (SiNx) or silicon oxide (SiOx), but is not limited thereto.

The semiconductor layer 123 may be disposed on the second buffer layer 104. The gate electrode 122 may be disposed on the gate insulating layer 105 to overlap with the channel region of the semiconductor layer 123. The gate electrode 122 may be formed as a single or multi-layer structure including molybdenum (Mo), copper (Cu), titanium (Ti), aluminum (Al), chromium (Cr), gold (Au), nickel (Ni), neodymium (Nd), or their compounds, but is not limited thereto. The gate electrode 122 may be arranged along with a gate line.

An interlayer insulating layer 106 may be disposed on the gate electrode 122. The interlayer insulating layer 106 may be made of the same material as the gate insulating layer 105, but is not limited thereto.

Source electrode 121 and drain electrode 124 may be disposed on the interlayer insulating layer 106. The source electrode 121 and the drain electrode 124 may be electrically connected to the semiconductor layer 123 through contact holes. The source electrode 121 and drain electrode 124 may be formed from metal materials. For example, the source electrode 121 and the drain electrode 124 may be formed as a single or multi-layer structure made of molybdenum (Mo), aluminum (Al), chromium (Cr), gold (Au), titanium (Ti), nickel (Ni), neodymium (Nd), or copper (Cu), or their alloys, but is not limited thereto. In one embodiment, the drain electrode 124 may be connected to the second light-shielding layer 103 through a contact hole.

A first planarization layer 111 may be formed on the source electrode 121, drain electrode 124, and bridge electrode 144. The first planarization layer 111 may flatten the upper surface of the thin-film transistor 120 and the capacitor 140, and may protect the thin-film transistor 120 and the capacitor 140. The first planarization layer 111 may be made of an organic material. For example, the first planarization layer 111 may be made of an organic material such as acrylic resin, epoxy resin, phenolic resin, polyamide resin, or polyimide resin, but is not limited thereto.

The second planarization layer 112 may be disposed on the first planarization layer 111. The second planarization layer 112 may be formed of the same material as the first planarization layer 111, but is not limited thereto.

A connection electrode 130 may be disposed between the first planarization layer 111 and the second planarization layer 112. The connection electrode 130 may electrically connect the thin-film transistor 120 and the light-emitting element LD. The connection electrode 130 may be made of the same material as the source electrode 121 and the drain electrode 124, but is not limited thereto.

A light-emitting element LD may be disposed on the second planarization layer 112. The light-emitting element LID may include an anode electrode 151, a light-emitting layer 152, and a cathode electrode 153.

The anode electrode 151 may be disposed on the second planarization layer 112. The anode electrode 151 may be electrically connected to the thin-film transistor 120 via the connection electrode 125. In the illustrated embodiment, the anode electrode 151 is directly connected to the thin-film transistor 120 through the connection electrode 125. However, this embodiment is not limited thereto, and the anode electrode 151 may be connected to the first transistor 120 via another electrode, such as a capacitor electrode.

The anode electrode 151 may be a reflective electrode that reflects light, but the embodiments of this specification are not limited thereto. The anode electrode 151 may include a laminated structure (Ti/Al/Ti) of aluminum (Al) and titanium (Ti), a laminated structure (ITO/A I/ITO) of aluminum (Al) and ITO, or a high-reflectivity metal material such as APC alloy, and may be formed as a single layer or multiple layers, but is not limited thereto.

A bank 154 may be formed on the second planarization layer 112. The bank 154 may be arranged to cover a portion of the anode electrode 151, such as an edge, while leaving another portion, such as a central region, exposed to the top. The region of the anode electrode 151 that is not covered by the bank 154 and remains exposed may be defined as a light-emitting area.

The bank 154 may include materials of the black series. For example, the bank 154 may be composed of materials containing black pigments such as benzocyclobutene resin, polyimide resin, acrylic resin, or photosensitive polymers, or other organic materials, but is not limited thereto. When made of materials containing black pigments or black dyes, the bank 154 may be referred to as a black bank. When the bank 154 is made of materials containing black pigments or black dyes, it can block light from external sources or block light reflected from external sources, thereby improving the brightness of the display device. The bank 154 may serve to absorb light reflected from below the bank 154 from light incident from the outside.

In one embodiment, the bank 154 may include a concave trench in a downward direction, as illustrated. The light-emitting layer 152 and cathode electrode 153, which cover the top of the bank 154, may be formed following the shape of the trench.

The light-emitting layer 152 may be disposed on the anode electrode 151 and the bank 154. The light-emitting layer 152 may include one or more light-emitting structures (or light-emitting elements or elements) stacked in either a hole-transport layer and electron-transport layer order, or the reverse order, on the anode electrode 151. For example, the hole transport layer may include a hole transport layer, hole injection layer, electron blocking layer, or P-type charge generation layer, but is not limited thereto. For example, the electron transport layer may include an electron transport layer, electron injection layer, hole blocking layer, or N-type charge generation layer, but is not limited thereto. The light-emitting layer 152 may be an organic light-emitting layer, inorganic light-emitting layer, quantum dot light-emitting layer, micro light-emitting diode, or micro mini light-emitting diode, but the embodiments described herein are not limited thereto. For example, the light-emitting layer 152 of the display panel 50 may include an organic light-emitting layer. The light-emitting layer 152 may include a red light-emitting layer, green light-emitting layer, and blue light-emitting layer. The light-emitting layer 152 may further include a white light-emitting layer, but is not limited thereto.

A cathode electrode 153 may be formed on the light-emitting layer 152. In one embodiment, the light-emitting layer 152 and cathode electrode 153 may be widely formed on the upper surface of the substrate 101, but this embodiment is not limited thereto.

An encapsulation layer 170 may be disposed on the cathode electrode 153. The encapsulation layer 170 may include one or more insulating layers. For example, the encapsulation layer 170 may include a first encapsulation layer, a second encapsulation layer located on top of the first encapsulation layer, and a third encapsulation layer located on top of the second encapsulation layer. The encapsulation layer 170 may include one or more inorganic insulating material layers and one or more organic material layers. For example, the first encapsulation layer and the third encapsulation layer may include inorganic insulating materials, while the second encapsulation layer may include organic materials, but this embodiment is not limited thereto.

On the encapsulation layer 170, various functional layers and/or insulating layers, such as a touch layer, color filter layer, black matrix, optical element layer, and flattening layer, which are not shown, may be further provided.

The pixel and display device including the pixel according to the embodiments is advantageous for allowing image display to be performed simultaneously while the pixel is being sensed.

The pixel and display device including the pixel according to the embodiments is advantageous in improving image quality degradation, such as dark spots and image discontinuities, caused by pixel sensing.

The pixel and display device including the pixel according to the embodiments is advantageous for improving image quality by sensing the characteristic values of the pixels while images are being displayed and compensating the image data based on the characteristic values.

The pixel and display device including the pixel according to the embodiments is advantageous for minimizing or at least reducing current leakage by using an oxide semiconductor thin-film transistor.

A though embodiments of this disclosure have been described above with reference to the accompanying drawings, it w ill be understood that the technical configuration of this disclosure described above can be implemented in other specific forms by those skilled in the art without changing the technical concept or essential features of the present disclosure. Therefore, it should be understood that the embodiments described above are exemplary and not limited in all respects. Furthermore, the scope of the present disclosure is defined by the claims set forth below, rather than the detailed description above. In addition, it should be understood that all modifications or variations derived from the meaning and scope of the claims and their equivalent concept are included within the scope of the disclosure.

What is claimed is:

1. A pixel comprising:

a light-emitting element;

a driving transistor connected to a first node coupled to the light-emitting element and a third node coupled to a high-potential driving voltage line, the driving transistor including a gate electrode connected to a second node;

a switching transistor connected to a data line and the second node, the switching transistor including a gate electrode configured to receive a first scan signal;

a sensing transistor connected to the driving transistor and a readout line, the sensing transistor including a gate electrode configured to receive a third scan signal;

a connection transistor connected to the light-emitting element and a light-emitting element of an adjacent pixel; and a connection control transistor connected to the sensing transistor and the light-emitting element, the connection control transistor including a gate electrode configured to receive a third light-emission signal.

2. The pixel of claim 1, wherein the connection transistor is turned on based on the sensing transistor being turned on and electrically connecting the light-emitting element to the light-emitting element of the adjacent pixel, and the connection control transistor is turned off based on the sensing transistor being turned on and electrically separating a sensing path via the sensing transistor from a light-emission path via the connection transistor.

3. The pixel of claim 1, wherein the connection transistor is configured to receive the third scan signal or a fifth scan signal.

4. The pixel of claim 3, wherein the third scan signal and the fifth scan signal are applied at a turn-off level for one frame based on the pixel being driven in a display driving process, and are applied at a turn-on level for one frame based on the pixel being driven in a sensing driving process.

5. The pixel of claim 4, wherein, during a sensing driving process the sensing transistor is turned on and outputs a sensing current including a characteristic value of the driving transistor to the readout line, the connection transistor is turned on to apply a driving current, which is applied to the light-emitting element of the adjacent pixel, to the light-emitting element, and the connection control transistor electrically separates a current path of the sensing current from a current path of the driving current.

6. The pixel of claim 1, further comprising:

an initialization transistor connected to a reference voltage line and the second node, the initialization transistor including a gate electrode configured to receive a second scan signal;

a first light-emission transistor connected to the high-potential driving voltage line and the third node, the first light-emission transistor including a gate electrode configured to receive a first light-emission signal;

a second light-emission transistor connected to a fourth node, which is connected to the sensing transistor and the connection control transistor, and the first node, the second light-emission transistor including a gate electrode configured to receive a second light-emission signal; and an anode initialization transistor connected to the light-emitting element and an initialization voltage line, the anode initialization transistor including a gate electrode configured to receive a fourth scan signal.

7. The pixel of claim 6, further comprising:

a first capacitor connected to the first node and the second node; and a second capacitor connected to the first node and the high-potential driving voltage line.

8. A display device comprising:

a display panel comprising pixels;

a data driver configured to apply data voltages to the pixels through data lines;

a gate driver configured to apply a first scan signal to a fifth scan signal and a first light-emission signal to a third light-emission signal to the pixels through gate lines and emission lines; and a timing controller configured to control operation timings of the data driver and the gate driver, wherein each of the pixels comprises:

a light-emitting element;

a driving transistor connected to a first node coupled to the light-emitting element and a third node coupled to a high-potential driving voltage line, the driving transistor including a gate electrode connected to a second node;

a switching transistor connected to a data line and the second node, the switching transistor including a gate electrode configured to receive the first scan signal;

a sensing transistor connected to the driving transistor and a readout line, the sensing transistor including a gate electrode configured to receive the third scan signal;

a connection transistor connected to the light-emitting element and a light-emitting element of an adjacent pixel, the connection transistor configured to receive the third scan signal or the fifth scan signal; and a connection control transistor connected to the sensing transistor and the light-emitting element, the connection control transistor including a gate electrode configured to receive the third light-emission signal.

9. The display device of claim 8, wherein the timing controller selects at least one sensing pixel among the pixels to sense a characteristic value during one frame, and the gate driver applies the third scan signal and the fifth scan signal at a turn-on level to the at least one sensing pixel during the one frame.

10. The display device of claim 9, wherein, in the at least one sensing pixel, the sensing transistor is turned on and outputs a sensing current, including a characteristic value of the driving transistor, to the readout line, the connection transistor is turned on to apply a driving current, which is applied to the light-emitting element of an adjacent pixel, to the light-emitting element, and the connection control transistor electrically separates a current path of the sensing current from a current path of the driving current.

11. The display device of claim 9, wherein the gate driver applies the third scan signal and the fifth scan signal at a turn-off level to remaining pixels, which are not selected as the at least one sensing pixel, during the one frame.

12. The display device of claim 9, wherein the gate driver comprises:

a plurality of stage circuits connected in cascade;

a first switching unit configured to connect a previous stage circuit to either a next-stage circuit or a second-next-stage circuit in response to the third scan signal or the fifth scan signal; and a second switching unit configured to apply the third scan signal or the fifth scan signal to a corresponding stage circuit in response to the third scan signal or the fifth scan signal.

13. The display device of claim 12, wherein each of the plurality of stage circuits comprises:

an output terminal configured to output a scan signal or a light-emission signal;

a first input terminal configured to receive a start signal or an output signal of a previous stage circuit; and a second input terminal configured to receive the third scan signal or the fifth scan signal, wherein the first switching unit connects the output terminal of the previous stage circuit to the first input terminal of the next-stage circuit or the second-next-stage circuit in response to the third scan signal or the fifth scan signal, and the second switching unit applies the third scan signal or the fifth scan signal to the second input terminal of the corresponding stage circuit in response to the third scan signal or the fifth scan signal.

14. The display device of claim 13, wherein the first switching unit comprises:

a first switching element connected to the output terminal of the previous stage circuit and the first input terminal of the next-stage circuit, the first switching element including a gate electrode configured to receive the third scan signal or the fifth scan signal; and a second switching element connected to the output terminal of the previous stage circuit and the first input terminal of the second-next-stage circuit, the second switching element including a gate electrode configured to receive the third scan signal or the fifth scan signal, wherein the second switching unit comprises a third switching element connected to an output terminal of the third scan signal or the fifth scan signal and the second input terminal of the corresponding stage circuit, the second switching unit including a gate electrode configured to receive the third scan signal or the fifth scan signal.

15. The display device of claim 14, wherein the first switching unit further comprises a first inverting element connected to an output terminal of the third scan signal or the fifth scan signal and the gate electrode of the first switching element.

16. The display device of claim 14, wherein the first switching element is an P-type transistor, and the second switching element is a N-type transistor.

17. The display device of claim 14, wherein the second switching unit further comprises a second inverting element connected to the third switching element and the second input terminal.

18. The display device of claim 8, wherein the display panel comprises:

a display area where the pixels are arranged; and a non-display area around the display area, wherein the gate driver comprises shift registers disposed in the non-display area on both left and right sides of the display area and configured to be symmetrical to each other.

19. The display device of claim 18, wherein the shift registers comprise:

a first shift register to a fifth shift register configured to output the first scan signal to the fifth scan signal, respectively; and a sixth shift register to an eighth shift register configured to output the first light-emission signal to the third light-emission signal, respectively, wherein the third shift register and the fifth shift register are disposed farthest from the display area.

* * * * *